(12) United States Patent
Miura et al.

(10) Patent No.: US 7,722,452 B2
(45) Date of Patent: May 25, 2010

(54) GAME PROGRAM AND GAME DEVICE

(75) Inventors: Akihiko Miura, Tokyo (JP); Masayuki Kawamoto, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 540 days.

(21) Appl. No.: 11/505,831

(22) Filed: Aug. 18, 2006

(65) Prior Publication Data
US 2007/0060235 A1 Mar. 15, 2007

(30) Foreign Application Priority Data
Aug. 19, 2005 (JP) .............................. 2005-238857

(51) Int. Cl.
*A63F 9/24* (2006.01)
(52) U.S. Cl. .................. 463/9; 463/2; 463/7; 463/23; 273/153 R; 273/153 S; 273/157 R; 273/155
(58) Field of Classification Search .................. 463/9, 463/2, 7, 23
See application file for complete search history.

(56) References Cited

U.S. PATENT DOCUMENTS 5,265,888 A * 11/1993 Yamamoto et al. ............ 463/10
6,344,861 B1 * 2/2002 Naughton et al. ........... 715/769

FOREIGN PATENT DOCUMENTS

| JP | 11-226263 | | 8/1999 |
| JP | 11226263 | * | 8/1999 |
| JP | 2001-178967 | | 7/2001 |

OTHER PUBLICATIONS

Dr. Mario Manual, <http://www.replacementdocs.com/download.php?view.1680>, Oct. 2008.*
Yoshi's Cookie Manual, <http://www.replacementdocs.com/download.php?view.1296>, Oct. 2008.*
Planet Puzzle League Manual, <http://www.replacementdocs.com/download.php?view.5495>, Oct. 2008.*

* cited by examiner

*Primary Examiner*—Dmitry Suhol
*Assistant Examiner*—Chase Leichliter
(74) *Attorney, Agent, or Firm*—Nixon & Vanderhye P.C.

(57) ABSTRACT

A game program of the present invention causes a computer to execute a first delete condition setting step of setting a delete condition of puzzle elements in which puzzle elements of the same kind in a first number or more are continuously arranged in a predetermined direction as a first delete condition and a second delete condition setting step of setting a next delete condition of the puzzle elements in which puzzle elements of the same kind in a second number which is smaller than the first number or more are continuously arranged in a predetermined direction as a second delete condition when it is judged that the first delete condition is achieved in the first delete condition judgment step.

12 Claims, 30 Drawing Sheets

F I G. 3
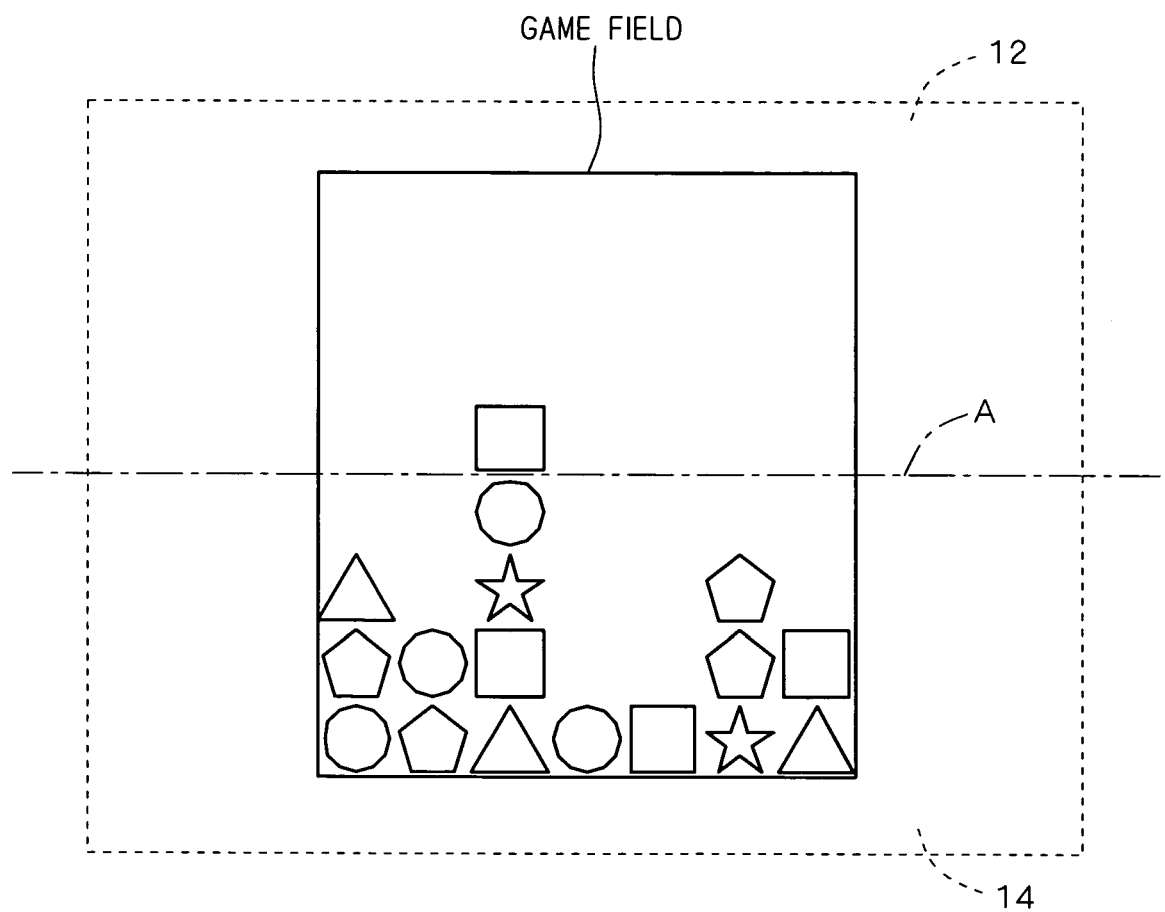

F I G . 4
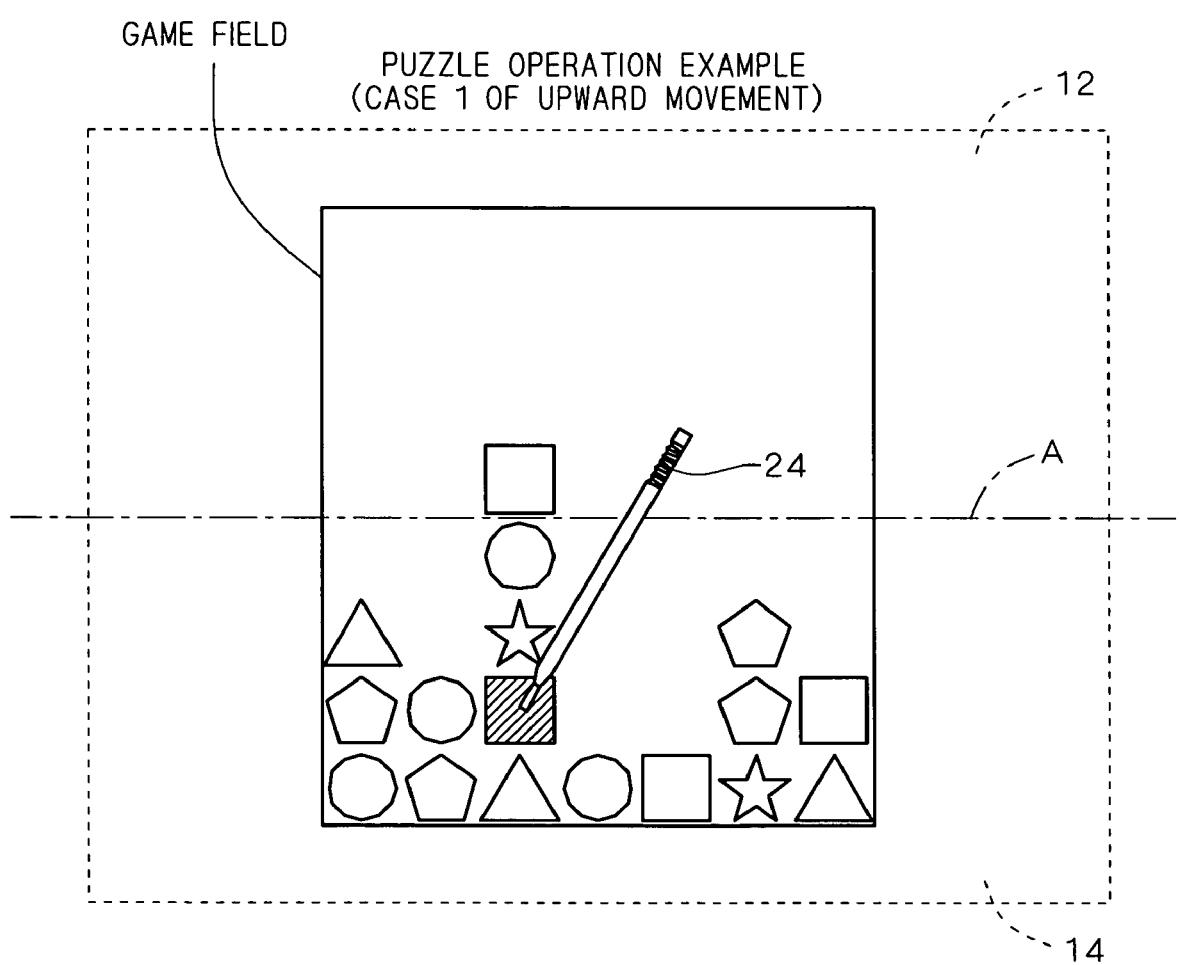

F I G . 1 5
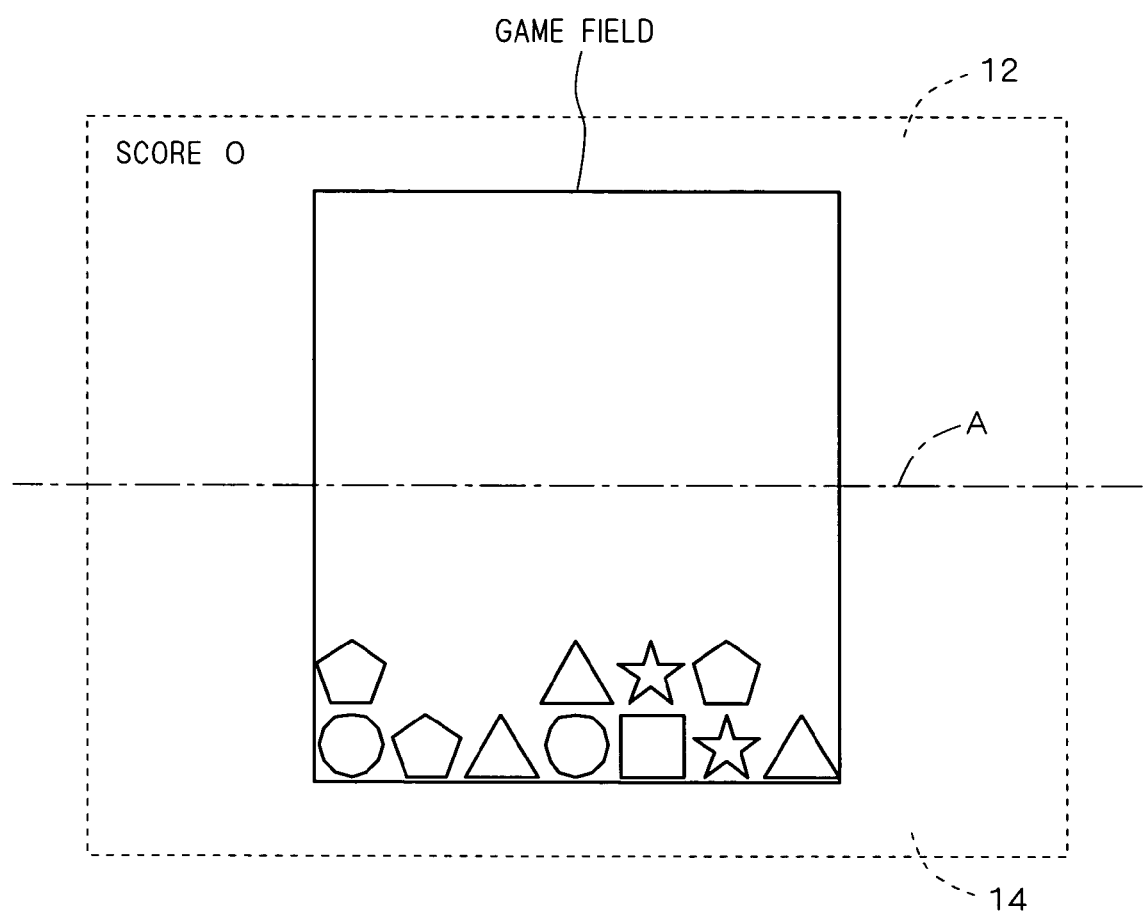

F I G . 1 6
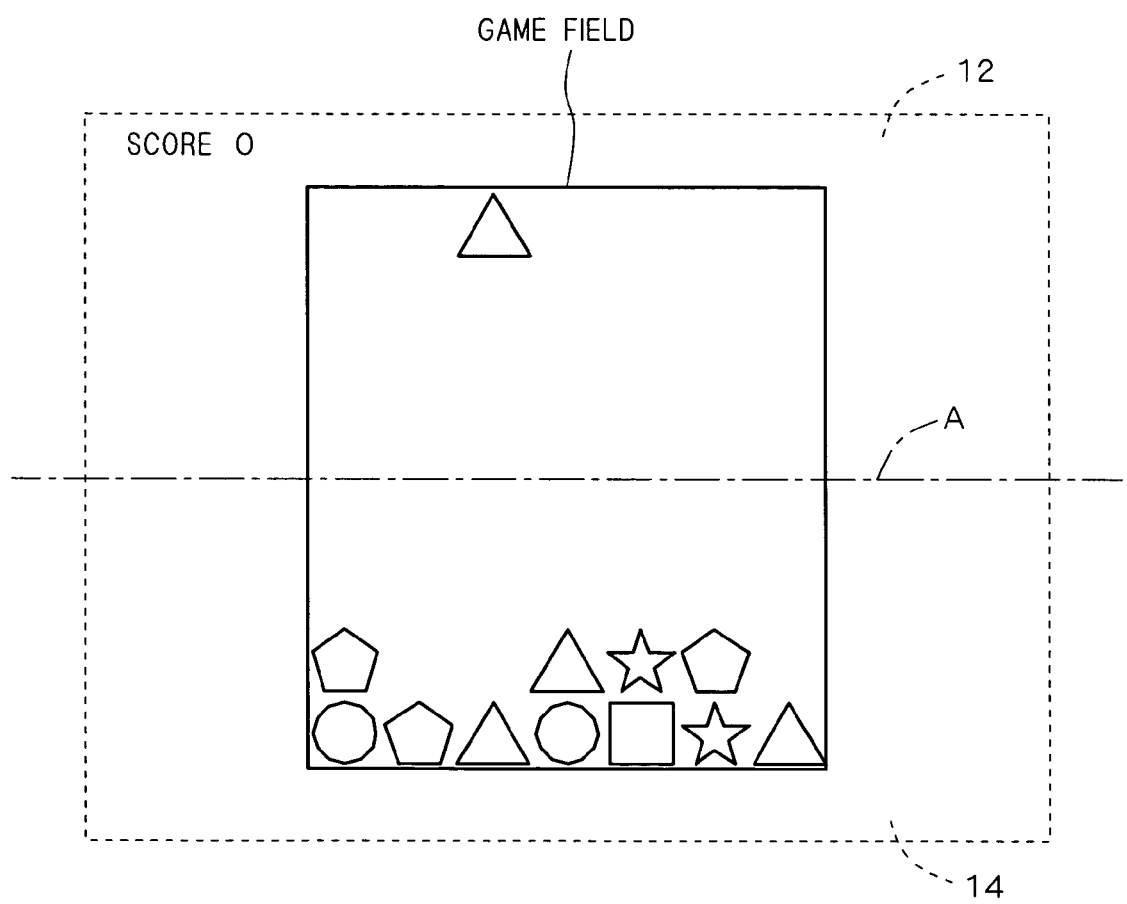

F I G . 1 7
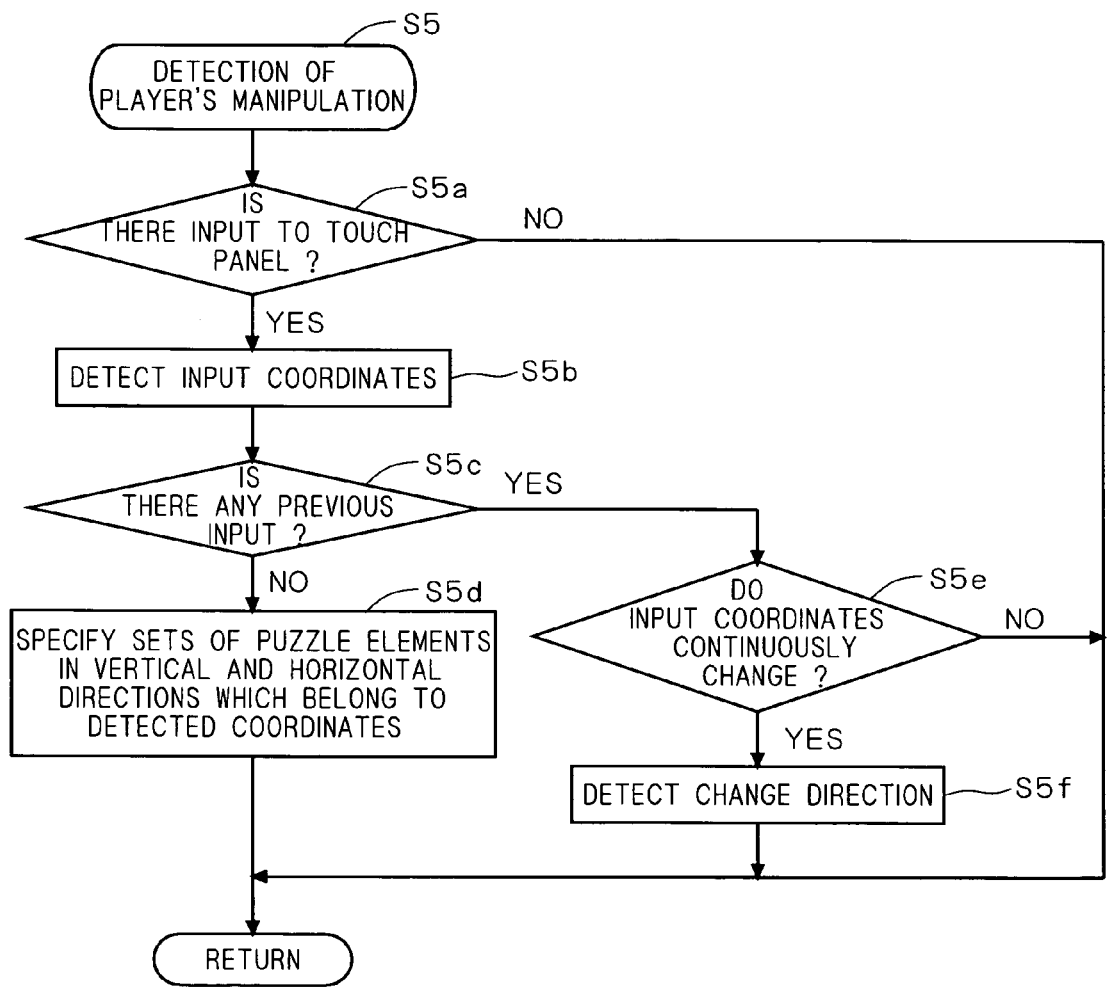

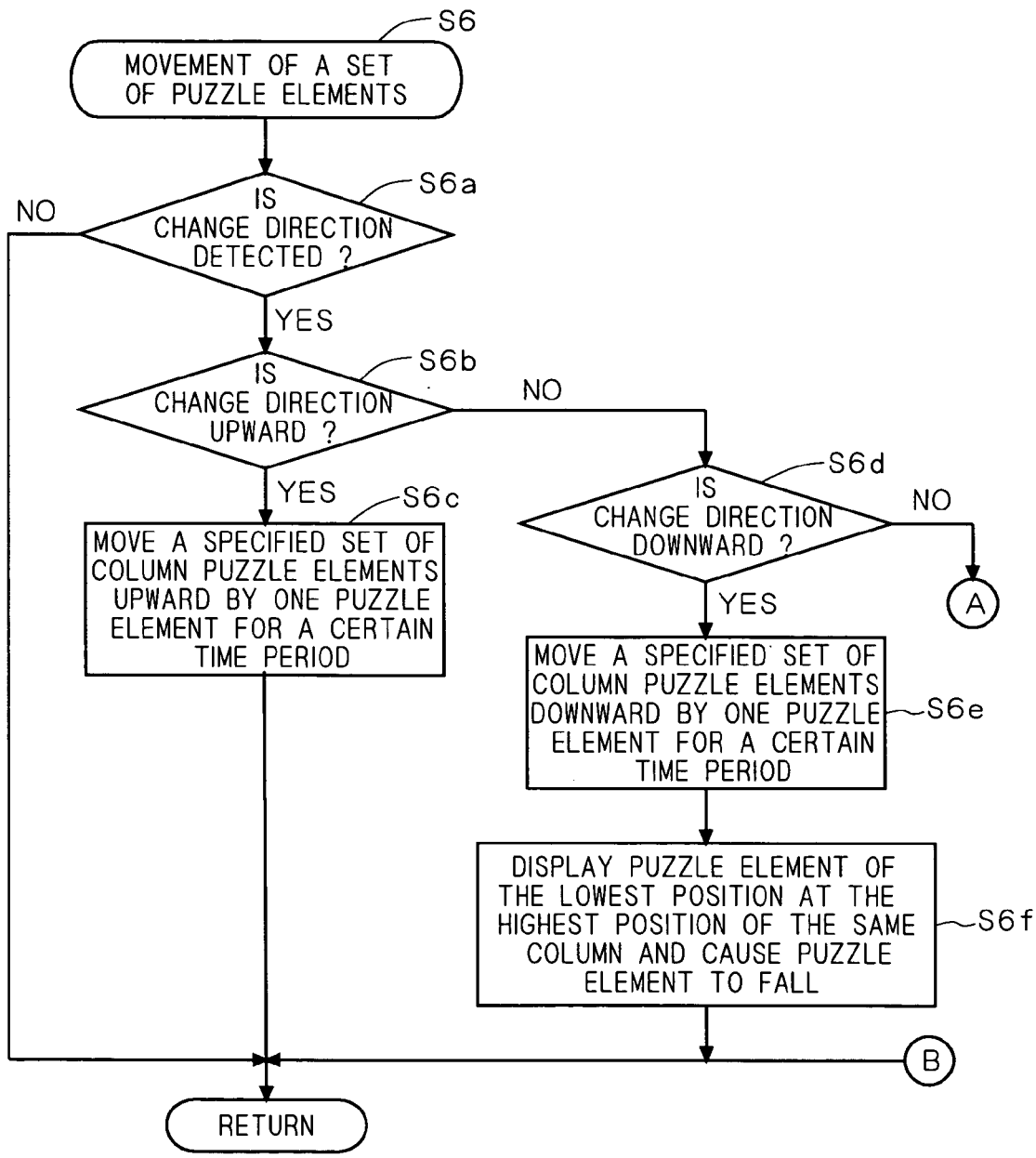

F I G . 2 6
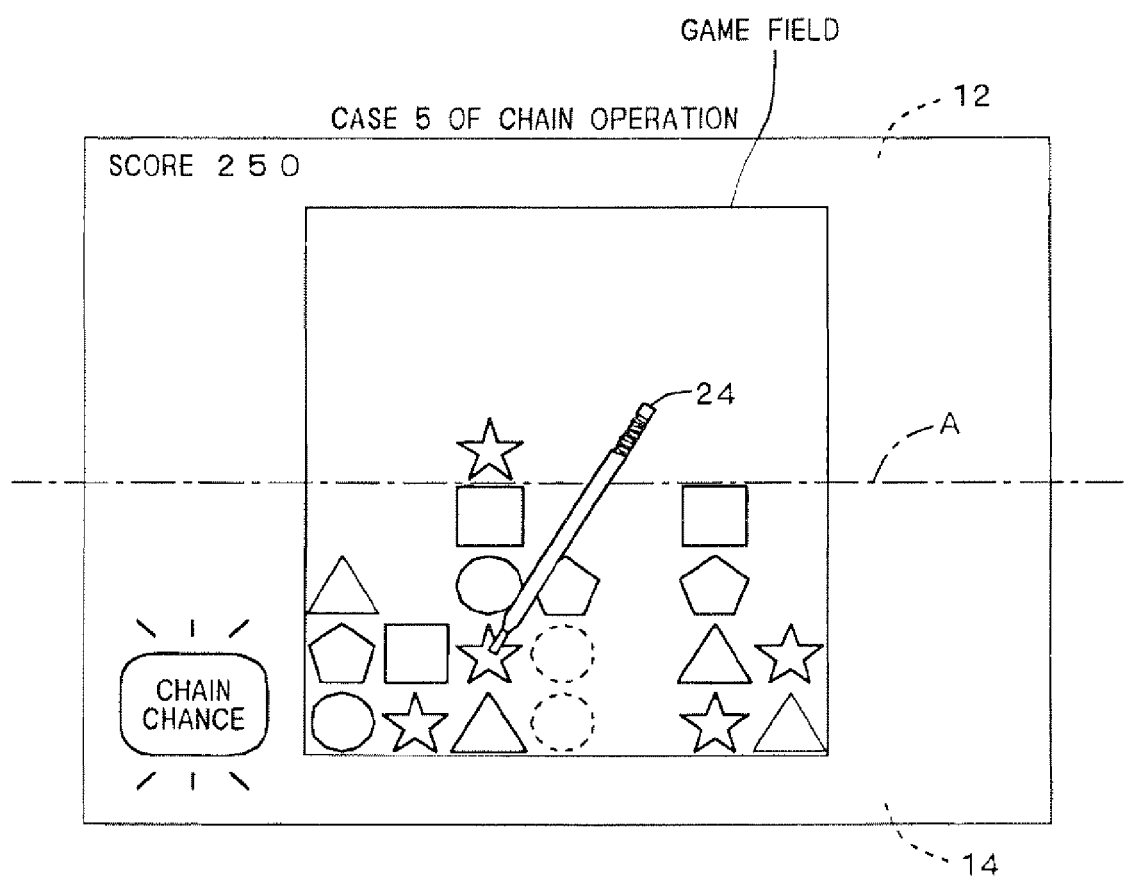

US 7,722,452 B2

GAME PROGRAM AND GAME DEVICE

BACKGROUND OF THE INVENTION

1. Field of the Invention

The present invention relates to a game program and a game device, and more particularly to a game program and a game device on a puzzle game.

2. Description of the Background Art

Among background arts are Japanese Patent Application Laid Open Gazette No. 2001-178967 and Japanese Patent Application Laid Open Gazette No. 11-226263.

The above two background arts are techniques on a puzzle game where a plurality of kinds of puzzle elements are displayed on a screen. In these techniques, assuming a condition in which a predetermined number of puzzle elements of the same kind are continuously arranged as a delete condition, a plurality of kinds of puzzle elements displayed on the screen are moved in accordance with an operation of a player and when the delete condition is satisfied, the puzzle elements satisfying the delete condition are deleted and the puzzle elements are moved downward in the screen so as to fill the space created by the deletion, and if puzzle elements satisfying the delete condition are formed by the movement, the puzzle elements are further deleted. Thus, a repeat of deletion and movement of the puzzle elements (a chain operation) is performed until there exists no puzzle element satisfying the delete condition.

In both the above two background arts, since the delete condition is always constant, there is a problem that it is hard to continue a chain operation in which deletion of the puzzle elements is repeated for a long time. Therefore, the game is hard to deal with for a beginner who is inexperienced in it. Though it is possible to set the delete condition easier in advance (for example, a condition in which two or more puzzle elements of the same kind are continuously arranged is set as the delete condition), in this case, since the delete condition can be satisfied easily, the puzzle elements are instantly deleted and it is hard to leave puzzle elements so as to continue a chain operation for a long time, and as a result, since it becomes hard to continue the chain operation, there arises a problem that the game loses its interest.

SUMMARY

In a non-limiting aspect, a game program and a game device capable of changing a delete condition of puzzle elements in accordance with the proceeding of a game are provided. In another non-limiting aspect, a game program and a game device which can easily perform a chain operation in which deletion of puzzle elements is repeated are provided.

A non-limiting illustrative example can be intended for a computer software product including a recording medium in which a computer-readable game program is recorded. The game program is used for causing a computer to perform a puzzle game in which a plurality of kinds of puzzle elements are sequentially created and displayed on display means while the layout position of the puzzle elements is changed in accordance with an operation of a player and when puzzle elements of the same kind are arranged continuously in a predetermined direction, the puzzle elements of the same kind which are continuously arranged are deleted. The game program comprises a first delete condition setting step of setting a delete condition of the puzzle elements in which puzzle elements of the same kind in a first number or more are continuously arranged in a predetermined direction as a first delete condition, a first delete condition judgment step of judging if the first delete condition is achieved in accordance with the operation of the player, a puzzle element deleting step of deleting puzzle elements satisfying the first delete condition when it is judged that the first delete condition is achieved in the first delete condition judgment step, a second delete condition setting step of setting a next delete condition of the puzzle elements in which puzzle elements of the same kind in a second number which is smaller than the first number or more are continuously arranged in a predetermined direction as a second delete condition when it is judged that the first delete condition is achieved in the first delete condition judgment step, and a second delete condition judgment step of judging if the second delete condition is achieved after the second delete condition is set. In the game program, the puzzle element deleting step deletes puzzle elements satisfying the second delete condition when it is judged that the second delete condition is achieved in the second delete condition judgment step.

When it is judged that the first delete condition is achieved, the first delete condition is changed and a next delete condition of the puzzle elements in which puzzle elements of the same kind in the second number which is smaller than the first number or more are continuously arranged in a predetermined direction is set as the second delete condition. This makes it possible to change the delete condition of puzzle elements to an easier condition in accordance with the proceeding of the game. Therefore, it is possible to easily perform a chain operation in which deletion of puzzle elements is repeated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a view illustrating a basic operation;

FIGS. 4 to 6 are views each illustrating a basic operation in a case of moving a set of puzzle elements upward;

FIG. 15 is a view showing an exemplary initial screen;

FIG. 16 is a view showing a state where a puzzle element which is selected at random is created;

FIG. 17 is a sub-flowchart showing a flow of operation by a player;

FIGS. 18 and 19 are sub-flowcharts each showing an operation flow for movement of a set of puzzle elements;

FIGS. 24 to 26 are views each illustrating a chain operation;

DESCRIPTION OF THE PREFERRED EMBODIMENTS

Hereinafter, specific discussion on various aspect of the present invention will be presented on the basis of figures showing illustrative embodiment(s) and corresponding descriptions.

<A> Description of Game Device

Figure 1:
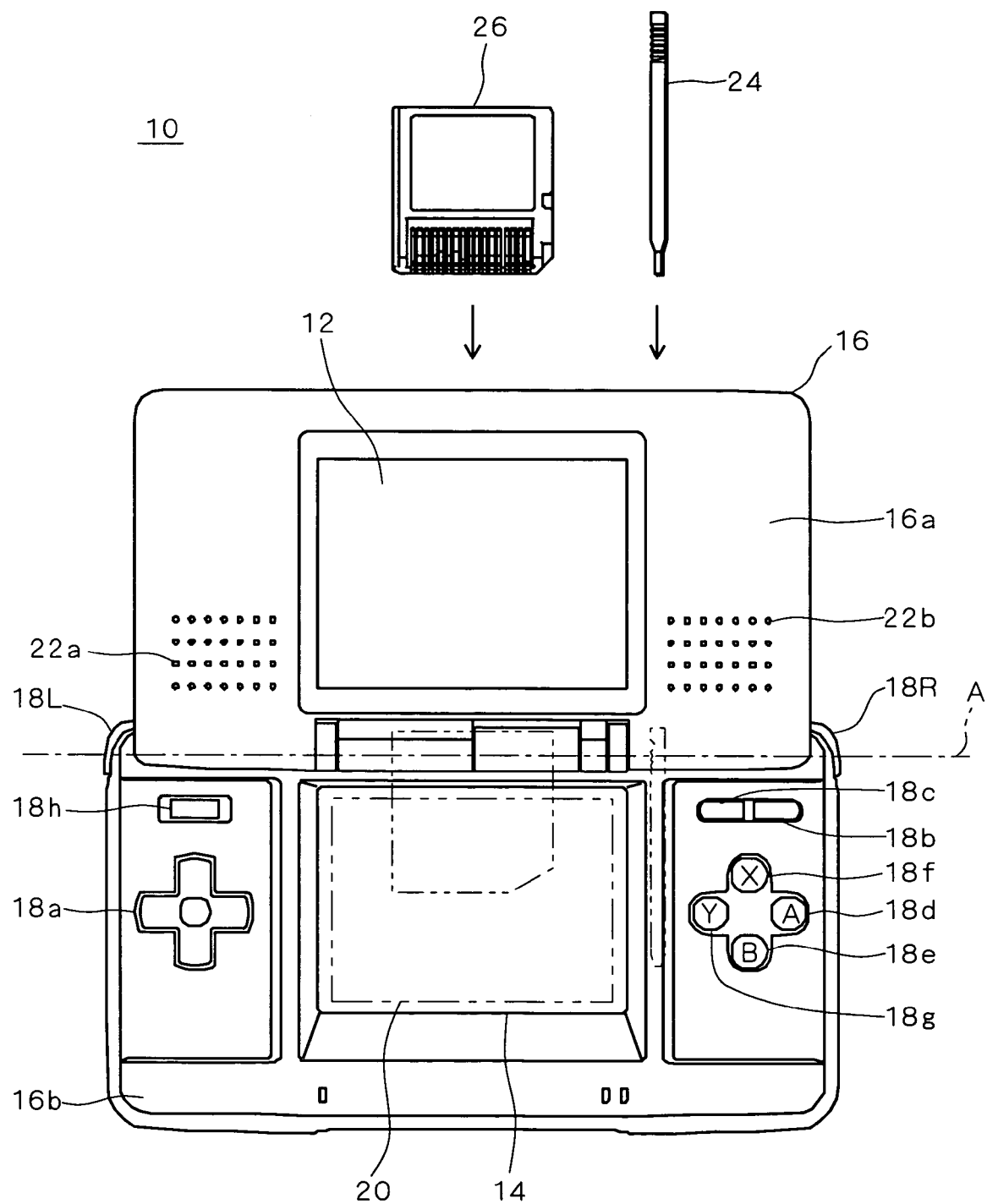
FIG. 1 is an illustration of an overview of a game device and the like in accordance with the present invention.

Referring to FIG. 1, a game device 10 in accordance with a preferred embodiment of the present invention includes a first liquid crystal display (LCD) 12 and a second LCD 14. The first LCD 12 and the second LCD 14 are so accommodated in a housing 16 as to be in a predetermined layout position. In the present preferred embodiment, the housing 16 consists of an upper housing 16a and a lower housing 16b, and the first LCD 12 is accommodated in the upper housing 16a and the second LCD 14 is accommodated in the lower housing 16b. Therefore, the first LCD 12 and the second LCD 14 are arranged adjacently to each other, being vertically aligned.

Though the LCD is used as a display in this preferred embodiment, an EL (Electronic Luminescence) display may be used instead of the LCD.

As can be seen from FIG. 1, the upper housing 16a has a planar shape larger than that of the first LCD 12 and an opening is formed in the upper housing 16a so as to expose a display surface of the first LCD 12 on one main surface thereof. On the other hand, the lower housing 16b has a planar shape which is almost equivalent to that of the upper housing 16a and an opening is formed in a substantially center portion in a horizontal direction so as to expose a display surface of the second LCD 14. In the upper housing 16a, sound release holes 22a on the right side and sound release holes 22b on the left side are so formed symmetrically as to sandwich the first LCD 12. In the housing 16, operation switches 18 (18a, 18b, 18c, 18d, 18e, 18f, 18h, 18g, 18L and 18R) are provided.

As for the positional relation between the upper housing 16a and the lower housing 16b, parts of the lower side (end) of the upper housing 16a and the upper side (end) of the lower housing 16b are connected so that the upper housing 16a and the lower housing 16b can be rotated about an axis A. Therefore, if the upper housing 16a is rotated to fold the housing 16 with the display surface of the first LCD 12 and the display surface of the second LCD 14 facing each other in not playing a game, it is possible to prevent the display surface of the first LCD 12 and the display surface of the second LCD 14 from being damaged, such as being scratched. The housing 16, however, may be formed with the upper housing 16a and the lower housing 16b united (fixed to each other) instead of being connected rotatably.

The operation switches 18 include a directional indicator switch (cross switch) 18a, a start switch 18b, a select switch 18c, an action switch (A button) 18d, an action switch (B button) 18e, an action switch (X button) 18f, an action switch (Y button) 18g, a power supply switch 18h, an action switch (L button) 18L and an action switch (R button) 18R. The switches 18a and 18h are positioned on the left side of the second LCD 14 in one main surface of the lower housing 16b. The switches 18b to 18g are positioned on the right side of the second LCD 14 in the same one main surface of the lower housing 16b. The switches 18L and 18R are positioned in parts of upper end (top portion) of the lower housing 16b other than the connection with the upper housing 16a, on the left and right sides, so as to sandwich the connection.

The directional indicator switch 18a functions as a digital joy stick and is used to indicate a moving direction of a player character (or player object) which is operated by a player, indicate a moving direction of a cursor or the like, by manipulating one of four press portions. The start switch 18b is formed of a push button and used to start (restart) a game, pause the game or the like. The select switch 18c is formed of a push button and used to select a game mode or the like.

The action switch 18d, i.e., the A button is formed of a push button and used to perform actions other than directional indication, i.e., cause the player character to make any actions such as punching, throwing, catching, riding on something, jumping or the like. In an action game, for example, this action switch 18d can give instructions to jump, punch, operate a weapon, or the like. In a role playing game (RPG) or a simulation RPG, the action switch 18d can give instructions to catch items, select and decide a weapon or a command, or the like. The action switch 18e, i.e., the B button is formed of a push button and used to change the game mode selected with the select switch 18c, cancel the action decided with the A button 18d, or the like.

The action switch 18f, i.e., the X button and the action switch 18g, i.e., the Y button are each formed of a push button and each serve as an auxiliary operation button when the proceeding of the game can not be performed by only the push buttons A and B. It is natural that the X button and the Y button do not necessarily have to be used in game play. The power supply switch 18h is a switch to turn on and off the power supply of the game device 10.

The action switch 18L (left push button) and the action switch 18R (right push button) are each formed of a push button, and the left push button (L button) 18L and the right push button (R button) 18R are used to perform the same operations as the A button 18d and the B button 18e or auxiliary operations for the A button 18d and the B button 18e, respectively.

The game device 10 is a game device using a touch panel, and onto an upper surface of the second LCD 14, a touch panel 20 is attached in association with the second LCD 14. As the touch panel 20, for example, any one of resistance film type, optical type (infrared type) and capacitive coupling type may be used. In the touch panel 20, its upper surface is manipulated, such as pushed or stroked (touched), with a stick 24, a pen (stylus pen) or fingers (hereinafter, sometimes referred to as "stick 24 or the like") and the coordinate position of the stick 24 or the like is thereby detected to output coordinate data.

In this preferred embodiment, the resolution of the display surface of the second LCD 14 is 228 dots×192 dots (the same or almost the same) applies to the first LCD 12) and the detection accuracy of the touch panel 20 is also 228 dots×192 dots correspondingly to the display screen, but the detection accuracy of the touch panel 20 may be higher or lower than the resolution of the display screen.

In playing a certain type of game, for example, on the second LCD 14 provided with the touch panel 20, a game screen which is watched and manipulated by a player is displayed, and on the first LCD 12, a game screen which is watched by the player is displayed. Specifically, on the first LCD 12, an image in which an object moves on orbits formed of vertical and horizontal lines is displayed. In the game screen on the second LCD 14, only vertical lines are displayed and the player manipulates the touch panel 20 with the stick 24 or the like, directly touching it, so as to draw horizontal lines thereon with respect to the vertical lines displayed on the second LCD 14. Then, the player draws the continuance of the orbits of the first LCD 12 on the second LCD 14 and thereby creates an orbit to guide the moving object to a predetermined position. Further, in the second LCD 14, various kinds of input instructions in accordance with the type of game may be performed. For example, text information, icons or the like may be displayed on the display screen of the second LCD 14 to allow the player to select a command.

Thus, since the game device 10 has the first LCD 12 and the second LCD 14 which serve as a two-screen display unit and the touch panel 20 is provided on either of these LCDs (in this preferred embodiment, on the second LCD 14), the game device 10 has a constitution of two screens (LCDs 12 and 14) and two-system operation units (18 and 20).

Further, in this preferred embodiment, the stick 24 can be accommodated in a storage unit (storage hole) (not shown) provided, e.g., on one side (right side) portion of the upper housing 16a and taken out as necessary. If no stick 24 is provided, it is not necessary to provide the storage unit.

Furthermore, the game device 10 includes a memory card (or game cartridge) 26, and the memory card 26 is removable and is inserted in from an insert port (not shown) provided on a back side or an upper end (of the side surface) of the lower housing 16b. Though not shown in FIG. 1, in a recess of the insert port, a connector 46 (see FIG. 2) to be connected with a connector (not shown) provided on a top portion of the memory card 26 in the direction of insertion, and when the memory card 26 is inserted into the insert port, these connectors are connected to each other to thereby allow a CPU core 42 (see FIG. 2) of the game device 10 to access the memory card 26.

Though not illustrated in FIG. 1, inside the lower housing 16b, a right speaker 30a (see FIG. 2) is provided in a position corresponding to the sound release holes 22a of the lower housing 16b and a left speaker 30b is provided in a position corresponding to the sound release holes 22b.

Though not shown in FIG. 1, for example, a battery housing box is provided on the back side of the lower housing 16b, and a volume controller (control knob), an external extension connector, an earphone jack and the like are provided on a bottom side of the lower housing 16b.

Figure 2:
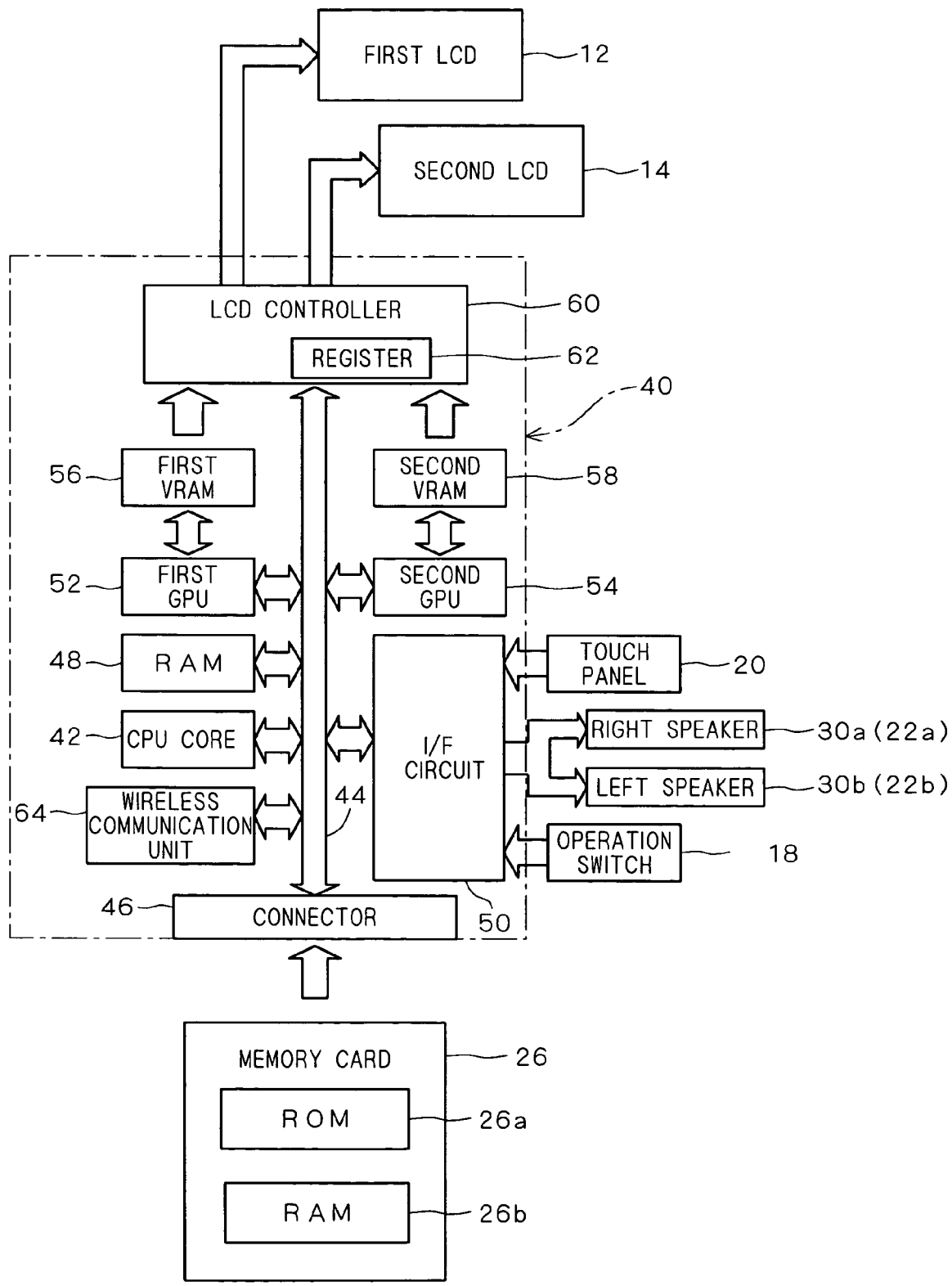
FIG. 2 is a block diagram showing a constitution of the game device in accordance with the present invention.

FIG. 2 is a block diagram showing an electric constitution of the game device 10. Referring to FIG. 2, the game device 10 includes an electronic circuit board 40, and on the electronic circuit board 40, circuit components such as the CPU core 42 and the like are mounted. The CPU core 42 is connected to the connector 46, a RAM 48, a first GPU (Graphic Processing Unit) 52, a second GPU 54, an I/F circuit 50, an LCD controller 60 and a wireless communication unit 64 through a bus 44.

As discussed above, to the connector 46, the memory card 26 is connected removably. The memory card 26 includes a ROM 26a and a RAM 26b. Though not shown, the ROM 26a and the RAM 26b are connected to each other with a bus and both connected to a connector (not shown) which is connected to the connector 46. As a result, the CPU core 42 can access the ROM 26a and the RAM 26b.

The ROM 26a stores a game program for a game to be performed by the game device 10, image data such as a character image, a background image, an item image and a message image and sound data such as a sound effect, a BGM and an imitative sound of the character in advance. The backup RAM 26b saves intermediate data and result data of the game.

The RAM 48 is used as a buffer memory or a working memory. In other words, the CPU core 42 loads the game program and the data such as the image data, the sound data and the like, which are stored in the ROM 26a of the memory card 26, on the RAM 48 and executes the loaded game program. The CPU core 42 stores temporary data such as game data and flag data in accordance with the proceeding of the game in the RAM 48.

The game program and the data such as the image data, the sound data and the like are collectively or partially and subsequently, as necessary, read out from the ROM 26a and stored in the RAM 48.

Each of the GPUs 52 and 54 forms part of drawing means and is formed of, e.g., a single-chip ASIC. When the GPU 52 or 54 receives a graphics command (drawing command) from the CPU core 42, the GPU generates game image data in accordance with this graphics command. In this case, the CPU core 42 gives an image generation program (included in the game program) needed for generating the game image data, in addition to the graphics command, to each of the GPUs 52 and 54.

The data (image data such as polygon, texture or the like) needed for executing the graphics command is stored in the RAM 48 and acquired by the GPU 52 or 54.

A first VRAM 56 is connected to the first GPU 52 and a second VRAM 58 is connected to the second GPU 54. The first GPU 52 draws the generated game image data in the first VRAM 56 and the second GPU 54 draws the generated game image data in the second VRAM 58.

The VRAMs 56 and 58 are connected to the LCD controller 60. The LCD controller 60 includes a register 62. The register 62 is formed of, e.g., one bit and stores a data value of "0" or "1" in accordance with the instruction of the CPU core 42. When the data value of the register 62 is "0", the LCD controller 60 outputs the game image data drawn in the first VRAM 56 to the second LCD 14 and outputs the game image data drawn in the second VRAM 58 to the first LCD 12. When the data value of the register 62 is "1", the LCD controller 60 outputs the game image data drawn in the first VRAM 56 to the first LCD 12 and outputs the game image data drawn in the second VRAM 58 to the second LCD 14.

To the I/F circuit 50, the operation switches 18, the touch panel 20, the right speaker 30a and the left speaker 30b are connected. In this case, the operation switches 18 include the above-described switches 18a, 18b, 18c, 18d, 18e, 18f, 18g, 18h, 18L and 18R. When any of the operation switches 18 is manipulated, a corresponding operation signal (operation data) is inputted to the CPU core 42 through the I/F circuit 50. The coordinate data detected in the touch panel 20 is also inputted to the CPU core 42 through the I/F circuit 50. Further, the CPU core 42 reads out the sound data such as the BGM, the sound effect, the imitative sound of the character and the like, which is needed for the game, from the ROM 48 and outputs the sound data through the I/F circuit 50 from the right speaker 30a and the left speaker 30b.

In a state where a two-player mode (match play mode) is selected, a radio signal is transmitted to/from a game device of a match opponent through the wireless communication unit 64. Specifically, the wireless communication unit 64 modulates communication data for the match opponent into a radio signal and sends it from an antenna (not shown) and receives a radio signal from the game device of the match opponent by the same antenna and demodulates it into communication data.

\<B\> Game Program

\<B-1\> General Outline of Game Program

A game program in accordance with the present invention causes a computer such as the above-described game device 10 or the like to perform a puzzle game.

A manner to install the game program in the computer may be any one of well-known manners. In the case of FIG. 2, the game program is stored in the memory card 26 and read out on the game device 10 therefrom. The CPU core 42 operates in accordance with the procedure prescribed by the game program to execute such process steps as discussed below on the game device 10.

In other words, the CPU core 42 is provided with specific functions by the game program and the game device 10 thereby comprises function means which are organically connected to execute the steps on the computer.

Hereinafter, taking a case of using the game device 10 as an example, the game program of the present invention will be described in detail.

In the game program of the present invention, a plurality of kinds of puzzle elements are sequentially created and displayed on the LCDs 12 and 14 (display means) shown in FIGS. 1 and 2. This will be discussed later in \<B-3\>.

Further, the layout position of the puzzle elements is changed in accordance with the operation of the player. This will be discussed later in \<B-2\> and \<B-4\>.

When puzzle elements of the same kind are continuously arranged in a predetermined direction, the puzzle elements of the same kind which are continuously arranged are deleted. Further, in the game program of the present invention, a delete condition of the puzzle elements is changed in accordance with the proceeding of the game. This will be discussed later in \<B-5\>.

The delete condition is defined as a condition in which puzzle elements of the same kind in a predetermined number or more are continuously arranged in a predetermined direction. Then, by reducing the predetermined number, the delete condition is changed. Therefore, the predetermined number restricting the delete condition after the change is smaller than the predetermined number restricting the delete condition before the change.

In the following discussion, simply-mentioned "predetermined number" refers to the number which restricts the delete condition of puzzle elements as discussed above.

\<B-2\> Change of Layout Position of Puzzle Elements (1)

Prior to specific discussion on the game program, first, a basic movement of puzzle elements in the present game will be described.

First, an upward movement of the puzzle elements (or a set of puzzle elements discussed later) will be described.

Figure 5:
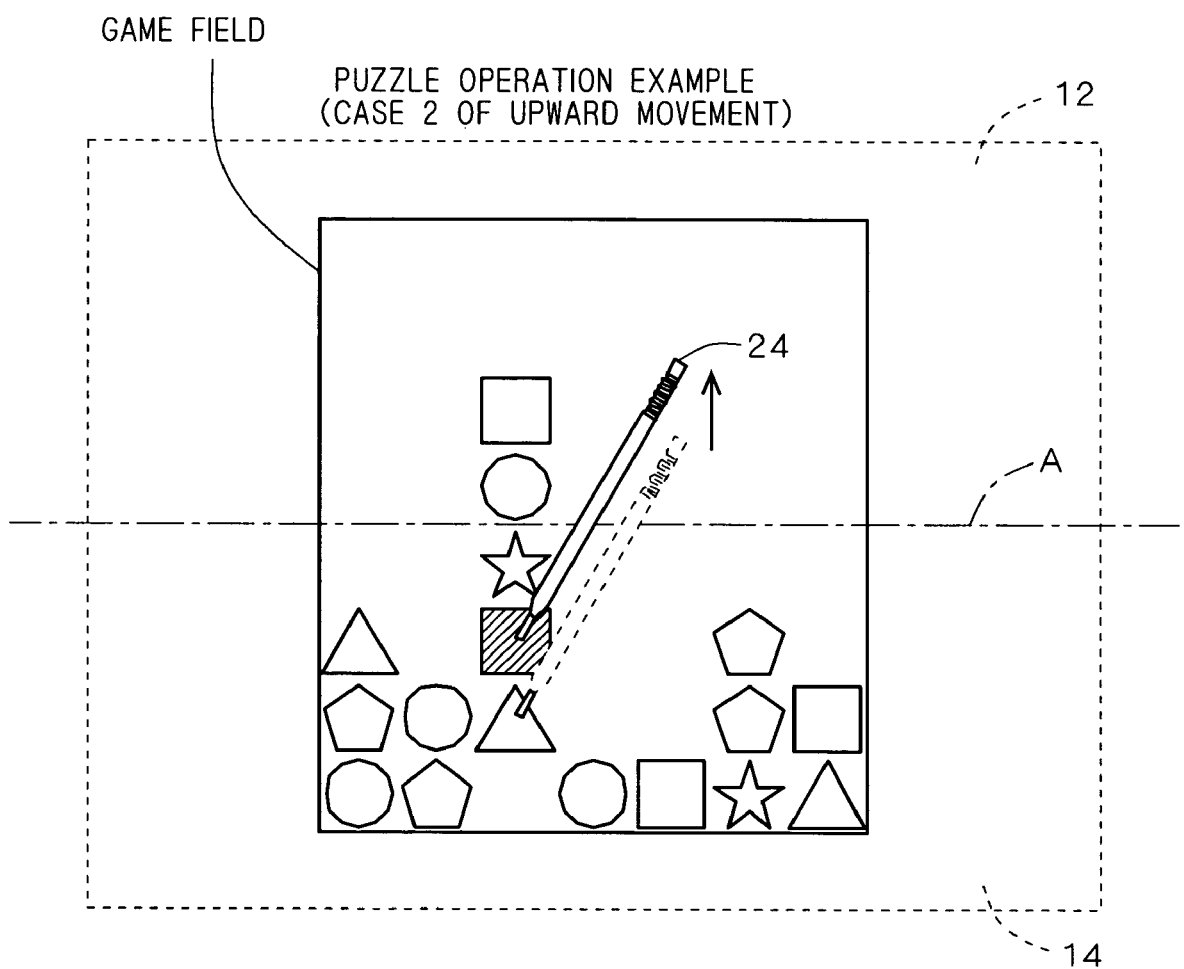
Figure 6:
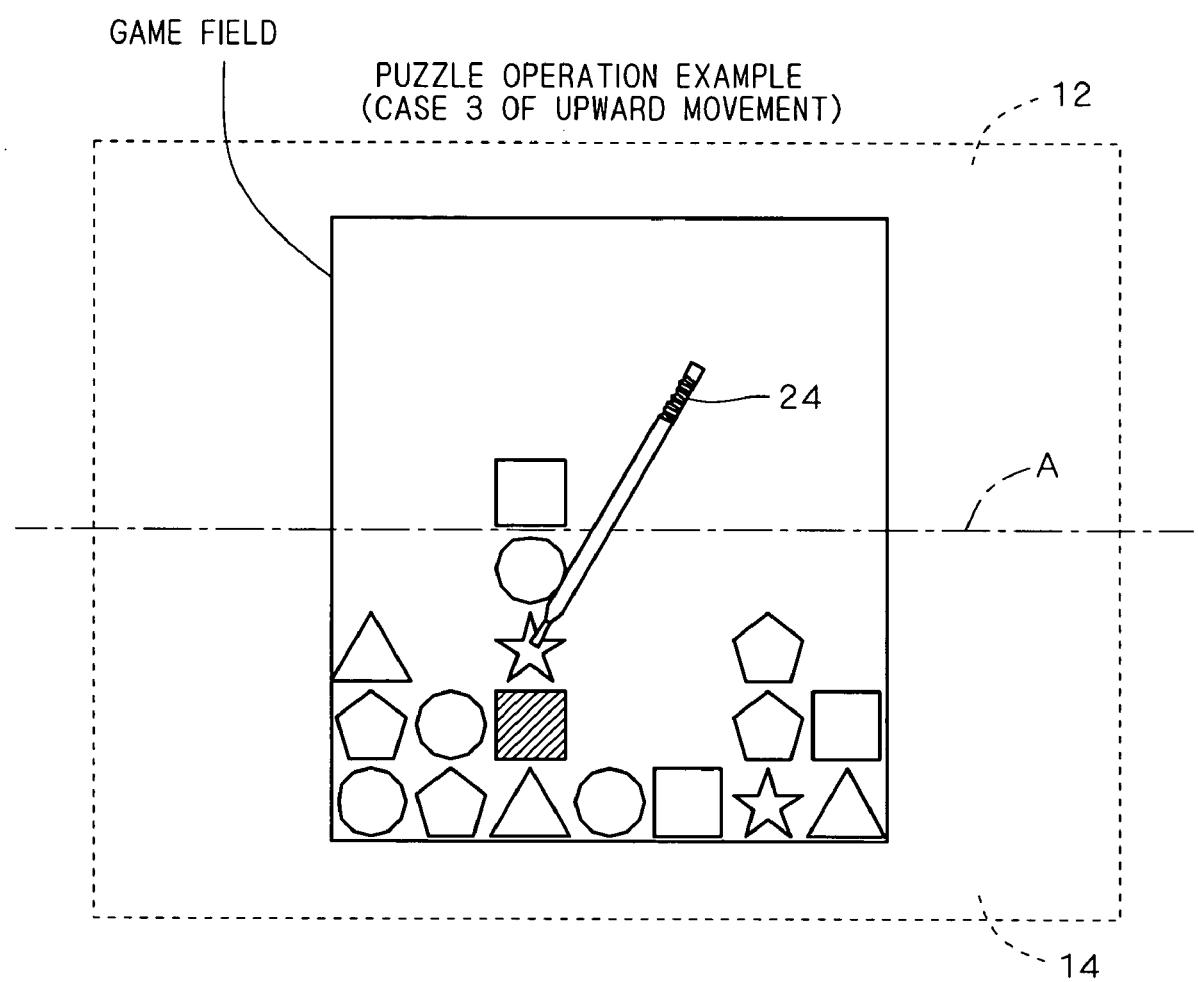

In FIG. 3, across the first LCD 12 and the second LCD 14, a plurality of and a plurality of kinds of puzzle elements are displayed inside a game field. In such a state, the stick 24 is brought into contact with a hatched puzzle element as shown in FIG. 4. Then, as shown in FIG. 5, the stick 24 is slidingly moved upward in this figure. At this time, a set of puzzle elements arranged in a vertical direction (column direction) to which the hatched puzzle element belongs are moved upward as a unit. Herein, in the case of upward movement, the state of FIG. 5 is kept for a certain time period and after that, the set of puzzle elements are so moved downward as to eliminate the space in the lower portion of the second LCD 14, as shown in FIG. 6.

In the present preferred embodiment, in the case of upward movement adopted is a manner in which a set of puzzle elements fall after a certain time period as discussed above.

As another manner, however, there may be a case where a set of puzzle elements are kept at the position after the upward movement, instead of falling.

Further, in this preferred embodiment, it is assumed that there are puzzle elements which satisfy a delete condition discussed later during a period while a set of puzzle elements are moved upward and fall. In such a case, the puzzle elements satisfying the delete condition are to be deleted.

Next, a downward movement of the puzzle elements (or a set of puzzle elements discussed later) will be described.

Figure 7:
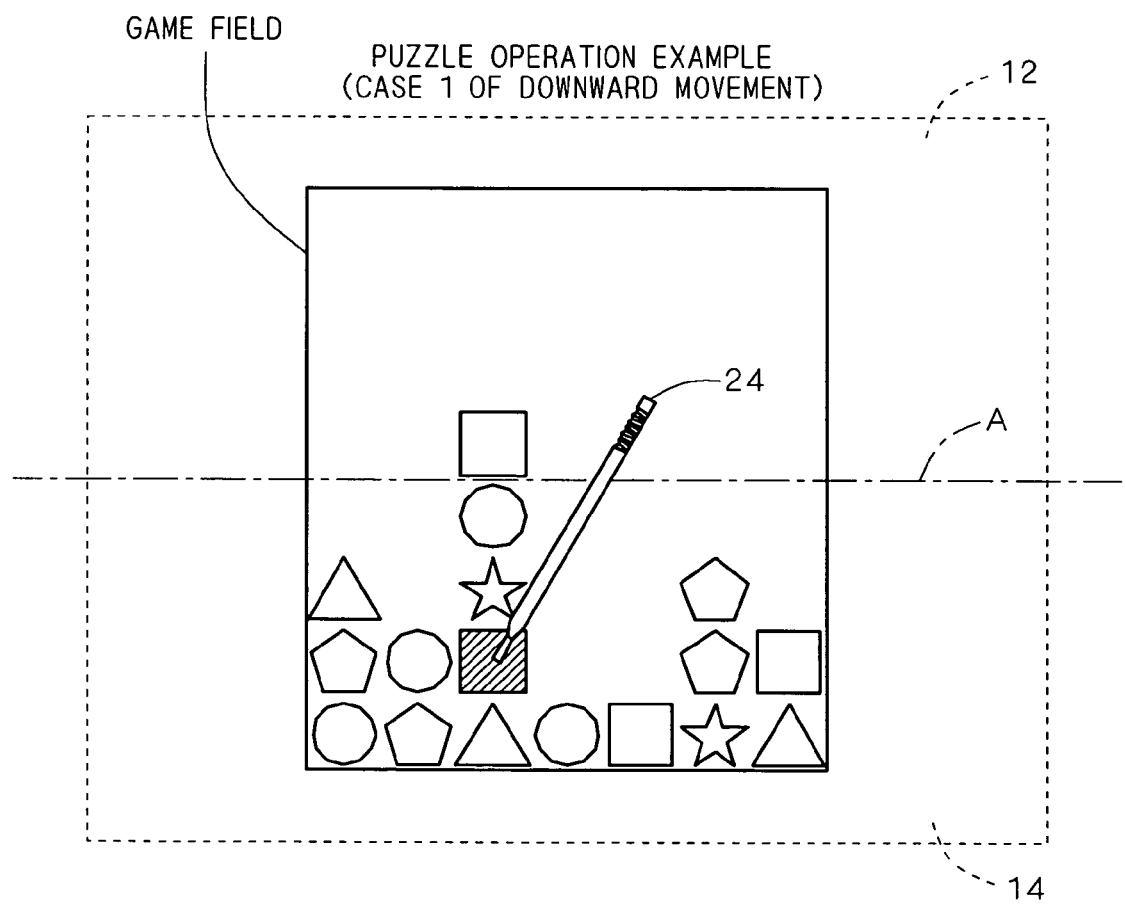
FIGS. 7 to 9 are views each illustrating a basic operation in a case of moving a set of puzzle elements downward.
Figure 8:
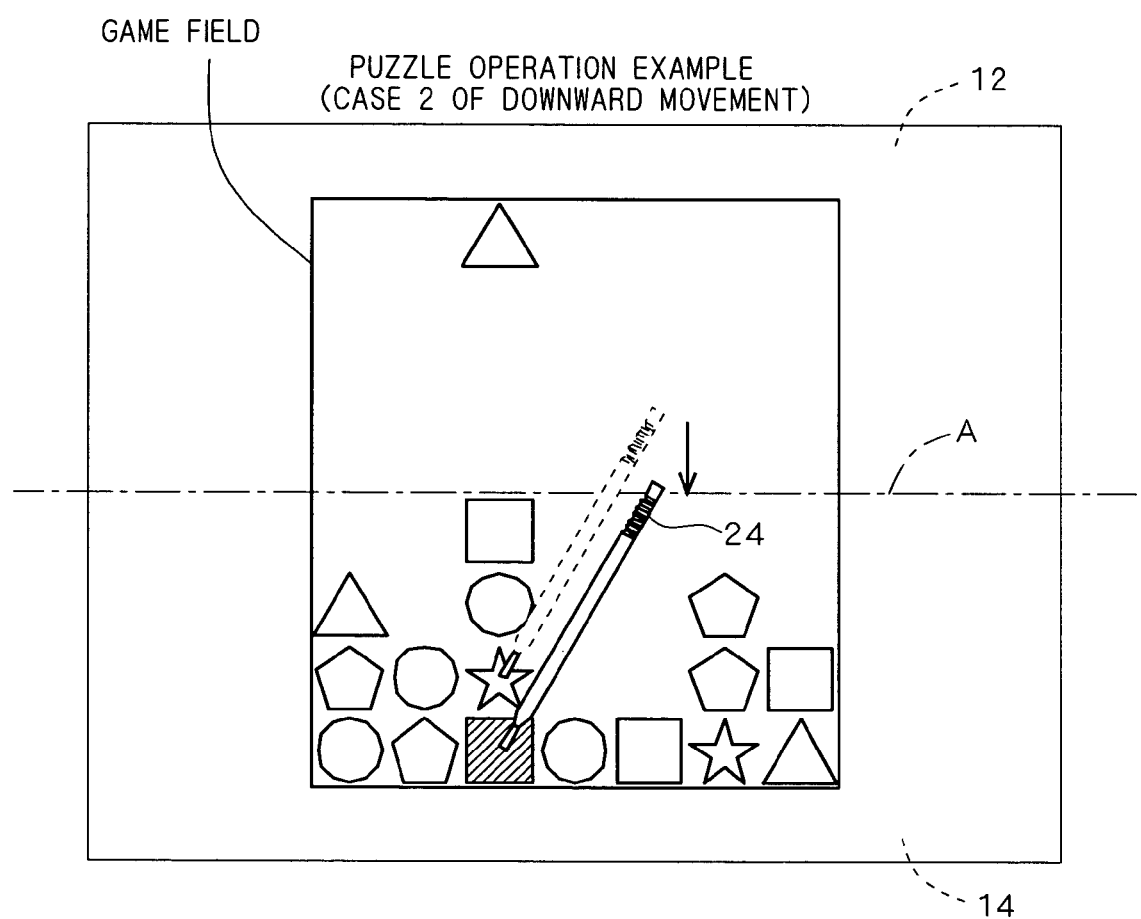
Figure 9:
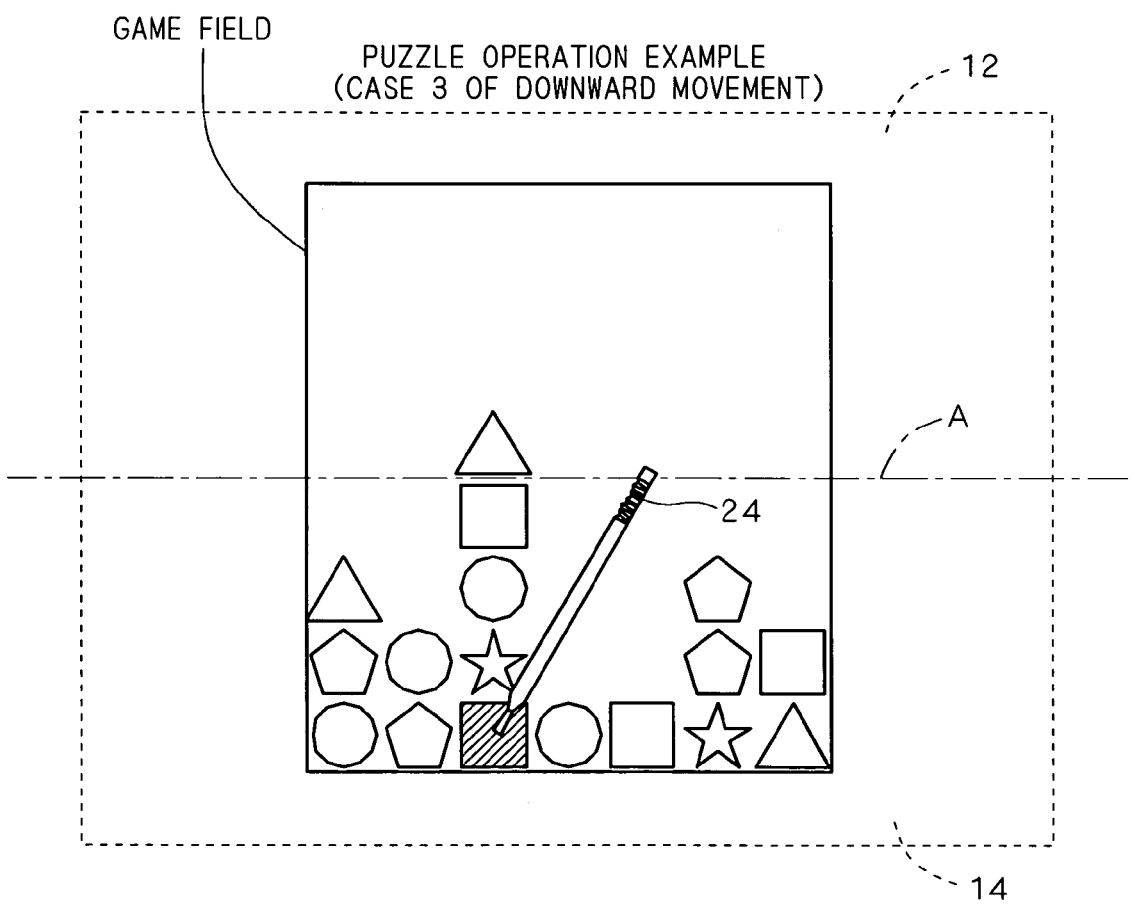

In the state of FIG. 3, the stick 24 is brought into contact with a hatched puzzle element as shown in FIG. 7. Then, as shown in FIG. 8, the stick 24 is slidingly moved downward in this figure. At this time, a set of puzzle elements arranged in a vertical direction (column direction) to which the hatched puzzle element belongs are moved downward as a unit. In this case, the lowest one of the set of puzzle elements in FIG. 7 (a puzzle element of triangle in FIG. 7) is redisplayed on the highest stage of the same column through the downward movement as can be seen in FIG. 8. After that, as shown in FIG. 9, the redisplayed puzzle element falls toward the set of puzzle elements.

Next, a rightward movement of the puzzle elements (or a set of puzzle elements discussed later) will be described.

Figure 10:
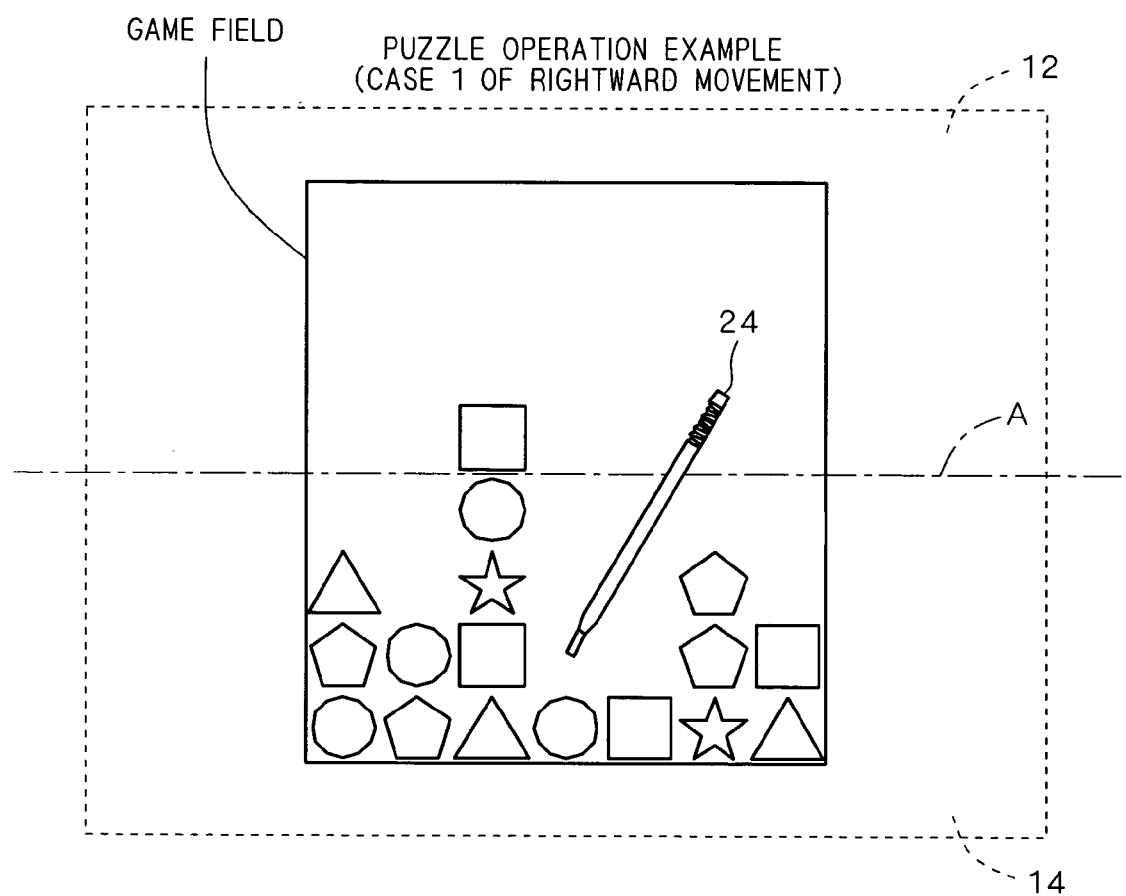
FIGS. 10 and 11 are views each illustrating a basic operation in a case of moving a set of puzzle elements rightward.
Figure 11:
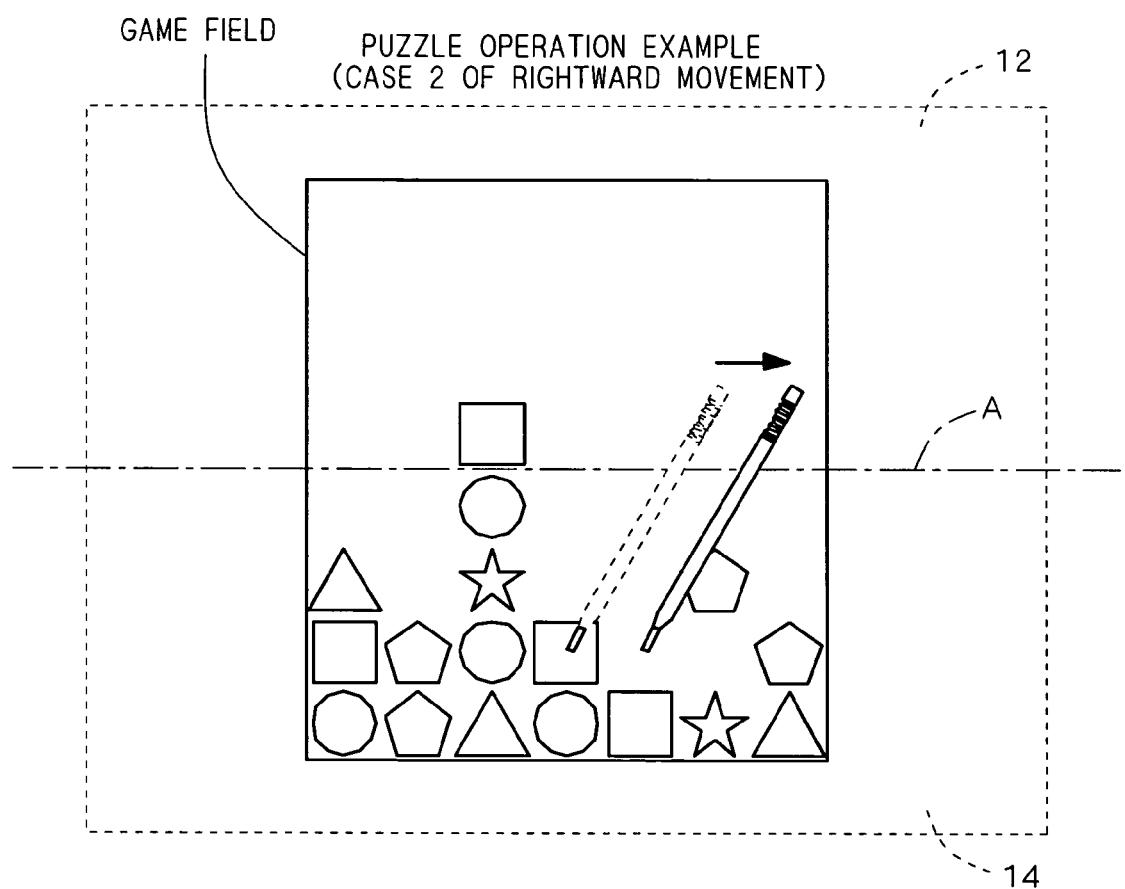

In the state of FIG. 3, the stick 24 is brought into contact with a portion of no puzzle element as shown in FIG. 10. Then, as shown in FIG. 11, the stick 24 is slidingly moved rightward in this figure. At this time, a set of puzzle elements arranged in a horizontal direction (row direction) to which the contact portion belongs are moved rightward as a unit. In this case, the rightmost one of the set of puzzle elements (a puzzle element of square in FIG. 10) is redisplayed on the leftmost end of the same row through the rightward movement as can be seen in FIG. 11.

Next, a leftward movement of the puzzle elements (or a set of puzzle elements discussed later) will be described.

Figure 12:
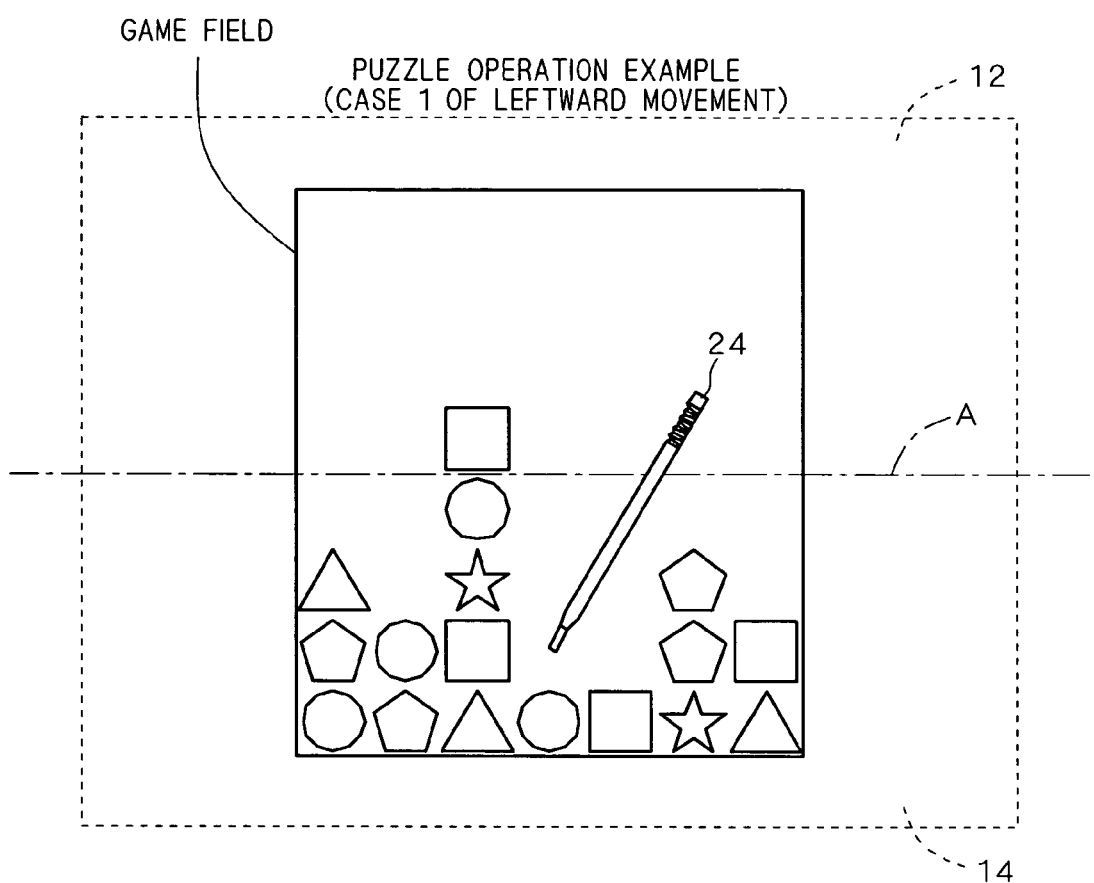
FIGS. 12 and 13 are views each illustrating a basic operation in a case of moving a set of puzzle elements leftward.
Figure 13:
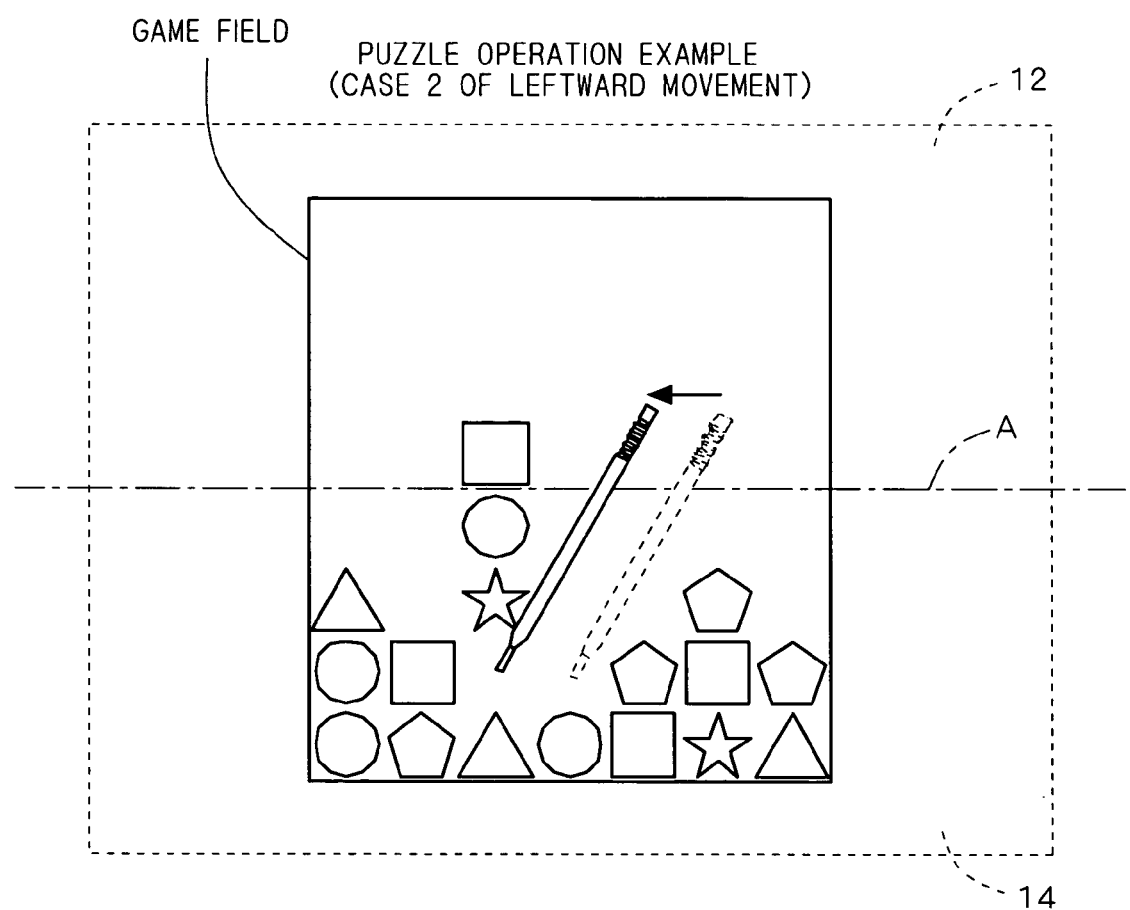

In the state of FIG. 3, the stick 24 is brought into contact with a portion of no puzzle element as shown in FIG. 12. Then, as shown in FIG. 13, the stick 24 is slidingly moved leftward in this figure. At this time, a set of puzzle elements arranged in a horizontal direction (row direction) to which the contact portion belongs are moved leftward as a unit. In this case, the leftmost one of the set of puzzle elements (a puzzle element of pentagon in FIG. 12) is redisplayed on the rightmost end of the same row through the leftward movement as can be seen in FIG. 13.

Herein, in each of the above movements, by one movement operation, a set of puzzle elements are moved by one puzzle element regardless of the distance of movement of the stick 24. As another preferred embodiment, however, a movement distance of the set of puzzle elements (the number of puzzle elements to be moved) may be changed in accordance with the distance of movement of the stick 24.

\<B-3\> Creation and Display of Puzzle Elements

Figure 14:
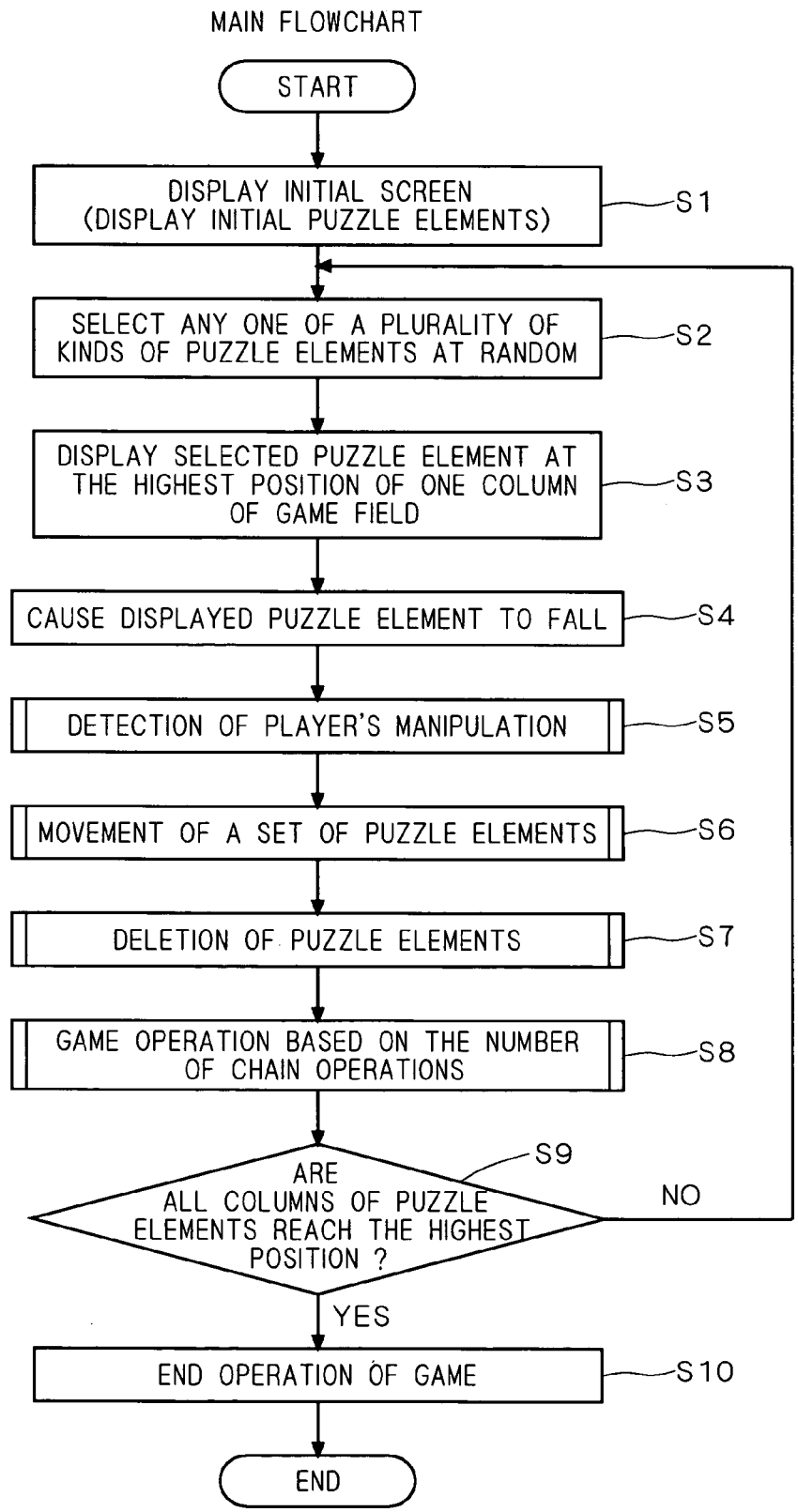
FIG. 14 is a main flowchart showing an operation flow of a game program in accordance with the present invention.

Next, discussion on the details of the puzzle game to be performed by the game program will be presented using a flowchart. FIG. 14 is a main flowchart showing an illustrative non-limiting operation flow of the game program discussed above.

Herein, an image is displayed on the LCDs 12 and 14 at a predetermined frame rate. Then, the main flowchart of FIG. 14 is executed repeatedly, for example, by the image frame (frame by frame).

As discussed above, under the control of the GPUs 52 and 54 controlled by the CPU core 42, image data is generated and the generated image data is temporarily stored in the VRAMs 56 and 58. Then, the image data stored in the VRAMs 56 and 58 is read out by the LCD controller 60 and displayed as an actual image on the LCDs 12 and 14.

In FIG. 14, when the memory card (game cartridge) 26 is inserted in the game device 10 and the power of the game device 10 is turned on, the puzzle game starts.

Then, as shown in FIG. 15, the initial screen is displayed on each of the LCDs 12 and 14. Specifically, first, some puzzle elements are displayed on the LCDs 12 and 14 (on only the second LCD 14 in FIG. 15) in a predetermined layout (Step S1).

Next, the CPU core 42 selects any one of a plurality of kinds of puzzle elements at random (Step S2). Then, as shown in FIG. 16, the selected puzzle element (the puzzle element of triangle in FIG. 16) is displayed (or created) at the highest position of any column in the game field (Step S3). Under the control of the CPU core 42 and the like, the created puzzle element is caused to fall downward in the figure (Step S4).

This fall movement is continuously performed until the created puzzle element gets on the puzzle element which is present in the falling direction or the created puzzle element reaches the lowest stage of the second LCD 14.

As time passes, a puzzle element is created one by one in the above-discussed manner.

As another preferred embodiment, instead of the creation of the puzzle elements in the above-discussed Steps S2 to S4, a new set of puzzle elements may rise from the lowest position of the game field. In other words, there may be a case where as time passes, all the puzzle elements (e.g., in one frame) displayed in the game field are moved upward by one puzzle element and in a row at the lowest position of the game field which becomes vacant by the movement of the puzzle elements, a set of puzzle elements which are selected at random are newly created (displayed).

Further, the puzzle elements of predetermined kinds in a predetermined number are stocked in the RAM 48. Then, among the stocked puzzle elements, the above-discussed selection and creation of puzzle elements are performed.

Each time when the puzzle element is created in the game field, the stocked puzzle elements are reduced. If the stocked puzzle elements are all lost by sequentially creating the puzzle elements, the present stage of the game is cleared.

Furthermore, it is assumed that a stack of puzzle elements in a column reaches the highest stage of the first LCD 12. In this case, the above-discussed creation of puzzle elements is performed from one of the other columns. In other words, the above-discussed creation of puzzle elements is not performed from the column in which the stack of puzzle elements reaches the highest stage of the first LCD 12.

As discussed later, in all the columns, when stacks of puzzle elements reach the highest stage of the first LCD 12, the game is ended. Further, in a match play mode, when the stacks of puzzle elements in all the columns of the game field of either one player reach the highest stage of the first LCD 12, the game is ended.

<B-4> Change of Layout Position of Puzzle Elements (2)

Next, the CPU core 42 detects if the player performs any manipulation in the touch panel 20 (Step S5). When the stick 24 is brought into contact with the touch panel 20, the CPU core 42 detects a signal relating to the contact through the I/F circuit 50.

Herein, the details of Step S5 will be discussed, referring to the sub-flowchart of FIG. 17.

First, the CPU core 42 judges if there is any input to the touch panel 20 (i.e., the contact of the stick 24) (Step S5a).

If the CPU core 42 judges that there is no input ("NO" in Step S5a), through returning, the process goes to Step S6 of FIG. 14. On the other hand, if the CPU core 42 judges that there is an input ("YES" in Step S5a), the CPU core 42 detects the coordinates of the position of input (i.e., the contact position of the stick 24) in the touch panel 20 (Step S5b).

Next, the CPU core 42 judges if there is any input to the touch panel 20 by the stick 24 previous to this input of the stick 24 (in the previous frame) (Step S5c).

If the CPU core 42 judges that there is no previous input ("NO" in Step S5c), the CPU core 42 specifies sets of puzzle elements which are arranged in the vertical (column) and horizontal (row) directions with respect to this position coordinates detected in Step S5b (hereinafter, referred to as "a set of column puzzle elements" and "a set of row puzzle elements") (Step S5d). Then, the CPU core 42 stores the specified sets of puzzle elements into the RAM 48. After that, through returning, the process goes to Step S6 of FIG. 14.

On the other hand, if the CPU core 42 judges that there is a previous input ("YES" in Step S5c), the CPU core 42 further judges if the input coordinates continuously change between the previous input and the present input (Step S5e).

If the CPU core 42 judges that the input coordinates do not continuously change ("NO" in Step S5e), through returning, the process goes to Step S6 of FIG. 14. On the other hand, if the CPU core 42 judges that the input coordinates continuously change ("YES" in Step S5e), the CPU core 42 detects the direction of change of the input coordinates (Step S5f). Specifically, assuming that the coordinate in the horizontal direction is x and that in the vertical direction is y, by comparing the value of input coordinates (x1, y1) of the previous input with the value of the input coordinates (x2, y2) which are the presently detected, it is detected which direction the input coordinates change, i.e., upward, downward, rightward or leftward. Then, the CPU core 42 stores the detected change direction of the input coordinates in the RAM 48. In Step S5f, there may be a case where the change direction is detected only if the amount of change in the input coordinates is equal to a predetermined value or more. With this operation, even if there is a change in the input coordinates which is not intended by the player and caused by hand vibration or the like, since detection of the change direction is not performed if the amount of change is smaller than the predetermined value, it is possible to prevent any misoperation. After that, through returning, the process goes to Step S6 of FIG. 14.

After the operation of Step S5, the CPU core 42 starts movement of a set of puzzle elements as a unit (Step S6). This operation will be discussed in detail, referring to the sub-flowcharts of FIGS. 18 and 19.

In FIG. 18, the CPU core 42 makes reference to the RAM 48. The CPU core 42 thereby judges if the change direction in the input coordinates is detected, as discussed in Step S5f (Step S6a).

If the CPU core 42 judges that the change direction in the input coordinates is not detected ("NO" in Step S6a), through returning, the process goes to Step S7 of FIG. 14. On the other hand, if the CPU core 42 judges that the change direction in the input coordinates is detected ("YES" in Step S6a), the CPU core 42 judges if the detected direction is upward (Step S6b).

If the CPU core 42 judges that the detected direction is upward ("YES" in Step S6b), the CPU core 42 reads out a set of column puzzle elements among the set of puzzle elements specified in Step S5d, from the RAM 48. Then, the CPU core 42 moves the set of column puzzle elements upward as a unit by one puzzle element in the presently-displayed puzzle layout (Step S6c). Herein, the details of this movement are such as discussed in <B-2>.

Further, as discussed in <B-2>, the upward movement of the set of column puzzle elements is kept for a certain time period and after that, the set of column puzzle elements fall downward.

After that, through returning, the process goes to Step S7 of FIG. 14.

On the other hand, if the CPU core 42 judges that the detected direction is not upward ("NO" in Step S6b), the CPU core 42 next judges if the detected direction is downward (Step S6d).

Figure 19:
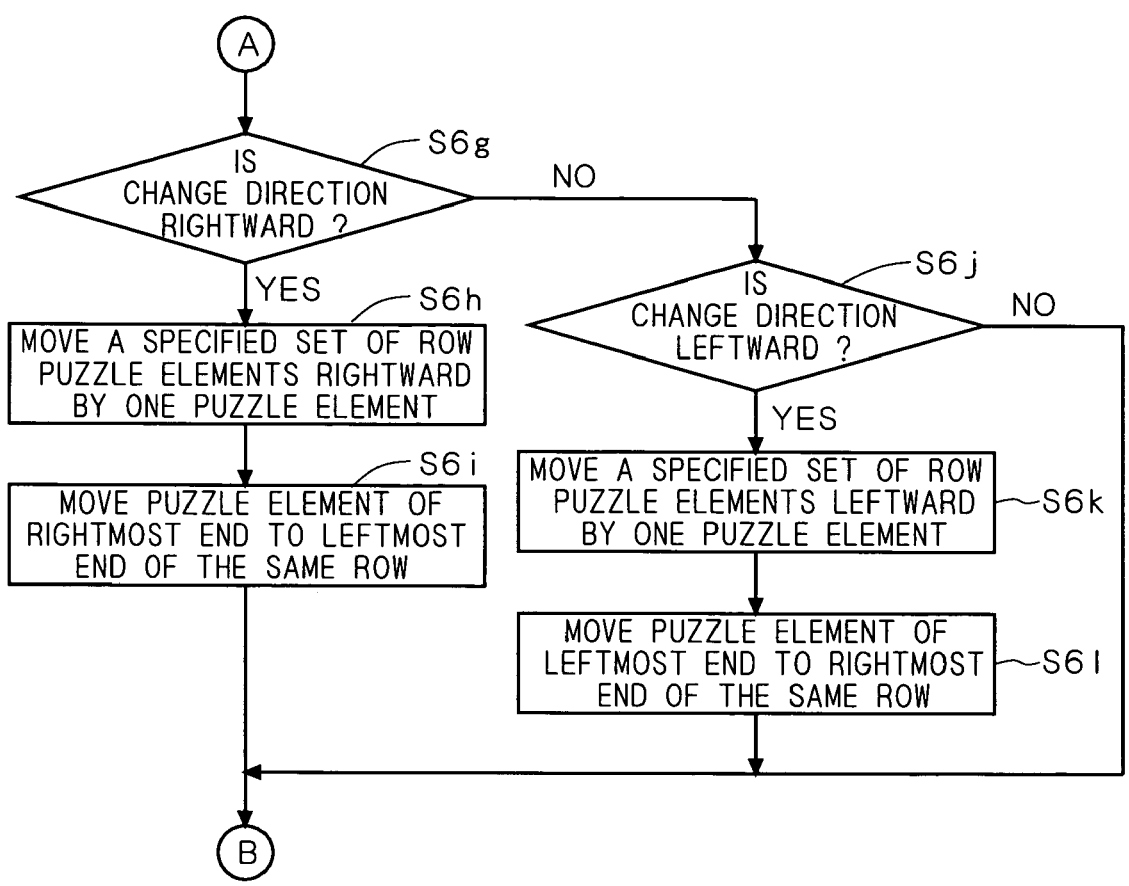

Then, if the CPU core 42 judges that the direction detected in Step S5f is not downward ("NO" in Step S6d), the process goes to Step S6g of FIG. 19.

On the other hand, if the CPU core 42 judges that the detected direction is downward ("YES" in Step S6d), the CPU core 42 reads out a set of column puzzle elements among the set of puzzle elements specified in Step S5d, from the RAM 48. Then, the CPU core 42 moves the set of column puzzle elements downward as a unit by one puzzle element in the presently-displayed puzzle layout (Step S6e). Herein, the details of this movement are such as discussed in <B-2>.

Herein, as discussed in <B-2>, under the control of the CPU core 42 and the like, the puzzle element displayed at the lowest stage in the set of column puzzle elements before the downward movement is redisplayed at the highest stage of the same column in the first LCD 12 through this downward movement (Step S6f).

After that, under the control of the CPU core 42 and the like, the redisplayed puzzle element is caused to fall on the puzzle element at the highest stage in the set of column puzzle elements (Step S6f).

After that, through returning, the process goes to Step S7 of FIG. 14.

If it is judged "NO" in Step S6d, the CPU core 42 next judges if the direction detected in Step S5f is rightward (Step S6g).

If it is judged that the detected direction is rightward ("YES" in Step S6g), the CPU core 42 reads out a set of row puzzle elements among the set of puzzle elements specified in Step S5d, from the RAM 48. Then, the CPU core 42 moves the set of row puzzle elements rightward as a unit by one puzzle element in the presently-displayed puzzle layout (Step S6h). Herein, the details of this movement are such as discussed in <B-2>.

Herein, as discussed in <B-2>, under the control of the CPU core 42, the puzzle element displayed at the rightmost end in the set of row puzzle elements before this movement is redisplayed at the leftmost end of the same row through this rightward movement (Step S6i).

After that, through returning, the process goes to Step S7 of FIG. 14.

On the other hand, if the CPU core 42 judges that the detected direction is not rightward ("NO" in Step S6g), the CPU core 42 next judges if the detected direction is leftward (Step S6j).

If it is judged that the direction detected in Step S5f is not leftward ("NO" in Step S6j), after that, through returning, the process goes to Step S7 of FIG. 14.

On the other hand, if it is judged that the detected direction is leftward ("YES" in Step S6j), the CPU core 42 reads out a set of row puzzle elements among the set of puzzle elements specified in Step S5d, from the RAM 48. Then, the CPU core 42 moves the set of row puzzle elements leftward as a unit by one puzzle element in the presently-displayed puzzle layout (Step S6k). Herein, the details of this movement are such as discussed in <B-2>.

Herein, as discussed in <B-2>, under the control of the CPU core 42, the puzzle element displayed at the leftmost end in the set of row puzzle elements before this movement is redisplayed at the rightmost end of the same row through this leftward movement (Step S6l).

After that, through returning, the process goes to Step S7 of FIG. 14.

<B-5> Deletion of Puzzle Elements and Change of Delete Condition

Figure 20:
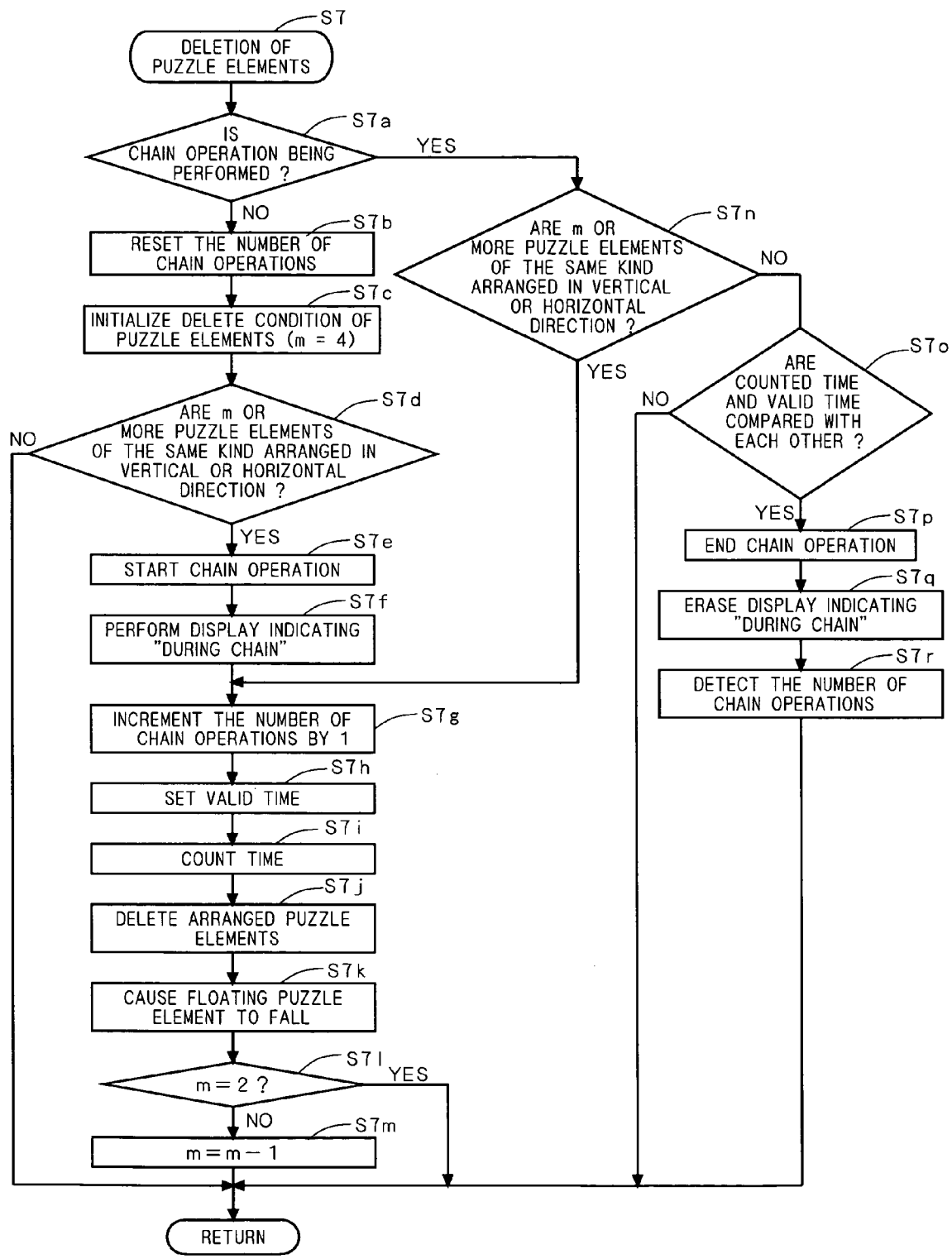
FIG. 20 is a sub-flowchart showing an operation flow for deletion of the puzzle elements.

Next, the deletion of the puzzle elements in Step S7 shown in FIG. 14 will be discussed in detail, referring to the sub-flowchart of FIG. 20.

First, the CPU core 42 judges if a chain operation is being performed presently (Step S7a). Herein, the chain operation refers to a repeat of the deletion and movement of puzzle elements within a valid time, as can be understood by the following discussion. After the valid time passes, the chain operation is ended. Then, as discussed later, when a delete condition of puzzle elements is achieved, this chain operation is resumed.

The delete condition of puzzle elements is defined as a condition in which puzzle elements of the same kind in a predetermined number or more are continuously arranged in a predetermined direction, as discussed in <B-1>.

In a case where it is judged that no chain operation is being performed presently ("NO" in Step S7a), if the number of chain operations in the previous operation is set in the RAM 48, the CPU core 42 resets the number of chain operations in the RAM 48 (sets 0 to the number of chain operations) (Step S7b). Herein, the number of chain operations refers to the number of achievements of the delete condition for the puzzle elements in the chain operations.

After that, the CPU core 42 sets a first delete condition in the RAM 48 as the delete condition of puzzle elements (initializes the delete condition, in other words, sets an initial value to the delete condition) (Step S7c).

Herein, the first delete condition is defined as a condition in which puzzle elements of the same kind in a first number or more are continuously arranged in a predetermined direction. In the present preferred embodiment, it is assumed that the predetermined direction includes vertical and horizontal directions and the first number is four. The first number may be arbitrarily set. The first number, however, is not smaller than three.

Further, as discussed later, the delete condition of puzzle elements changes as the chain operation goes on. In this preferred embodiment, for example, the predetermined number (m) restricting the delete condition is reduced as the chain operation goes on (e.g., the predetermined number changes from the first number to the second number which is smaller than the first number). Then, the predetermined number (m) is rewritten in the RAM 48 under the control of the CPU core 42. The reduction of the predetermined number (m), however, can be performed until m=2, and therefore when m=2, the predetermined number is not further reduced.

Next, the CPU core 42 judges if puzzle elements of the same kind in the first number (four in this case) or more are continuously arranged in the vertical or horizontal direction in accordance with the operation of the player (Step S7d). In other words, the CPU core 42 judges if the first delete condition which is presently stored in the RAM 48 is achieved.

If the CPU core 42 judges that the first delete condition is not achieved ("NO" in Step S7d), through returning, the process goes to Step S8 of FIG. 14. On the other hand, if the CPU core 42 judges that the first delete condition is achieved ("YES" in Step S7d), the CPU core 42 starts a chain operation (Step S7e).

Figure 22:
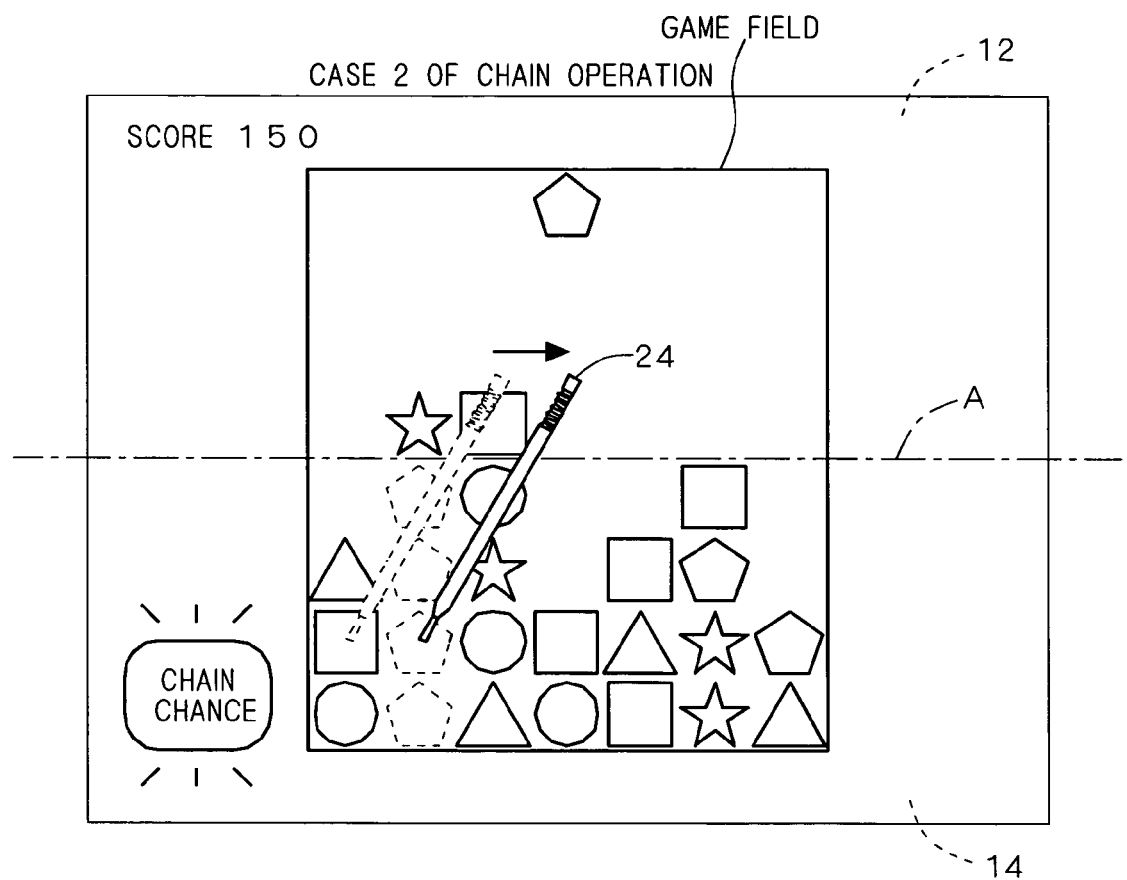

First, under the control of the CPU core 42 and the GPUs 52 and 54, as shown in FIG. 22, a display indicating "during a chain operation", e.g., "CHAIN CHANCE", is made on the second LCD 14 (Step S7f). Subsequently, the CPU core 42 increments the number of chain operations (the number of achievements of the delete condition in the chain operations) which is stored in the RAM 48 by "1" (Step S7g).

Next, the CPU core 42 sets a first valid time in the RAM 48 (Step S7h). The first valid time is a valid time while the second delete condition is set as discussed later.

The length of the valid time may be determined in accordance with the delete condition of puzzle elements which is set (especially, the predetermined number (m) restricting the delete condition) or the present number of chain operations. For example, as the predetermined number (m) which is set becomes smaller, the valid time is set shorter (or longer). Alternatively, as the present number of chain operations becomes larger, the valid time is set shorter (or longer).

Herein, it is preferable from the viewpoint of tension of the game that the valid time should be set shorter as the predetermined number (m) becomes smaller and/or the number of chain operations becomes larger.

Next, the CPU core 42 starts a time counting operation (Step S7i). Herein counted is a time (first time) passing from the time when the first valid time is set.

Since the CPU core 42 judges that the presently-set delete condition (the first delete condition) is achieved in Step S7d, the puzzle elements satisfying the delete condition are deleted (Step S7j).

Figure 21:
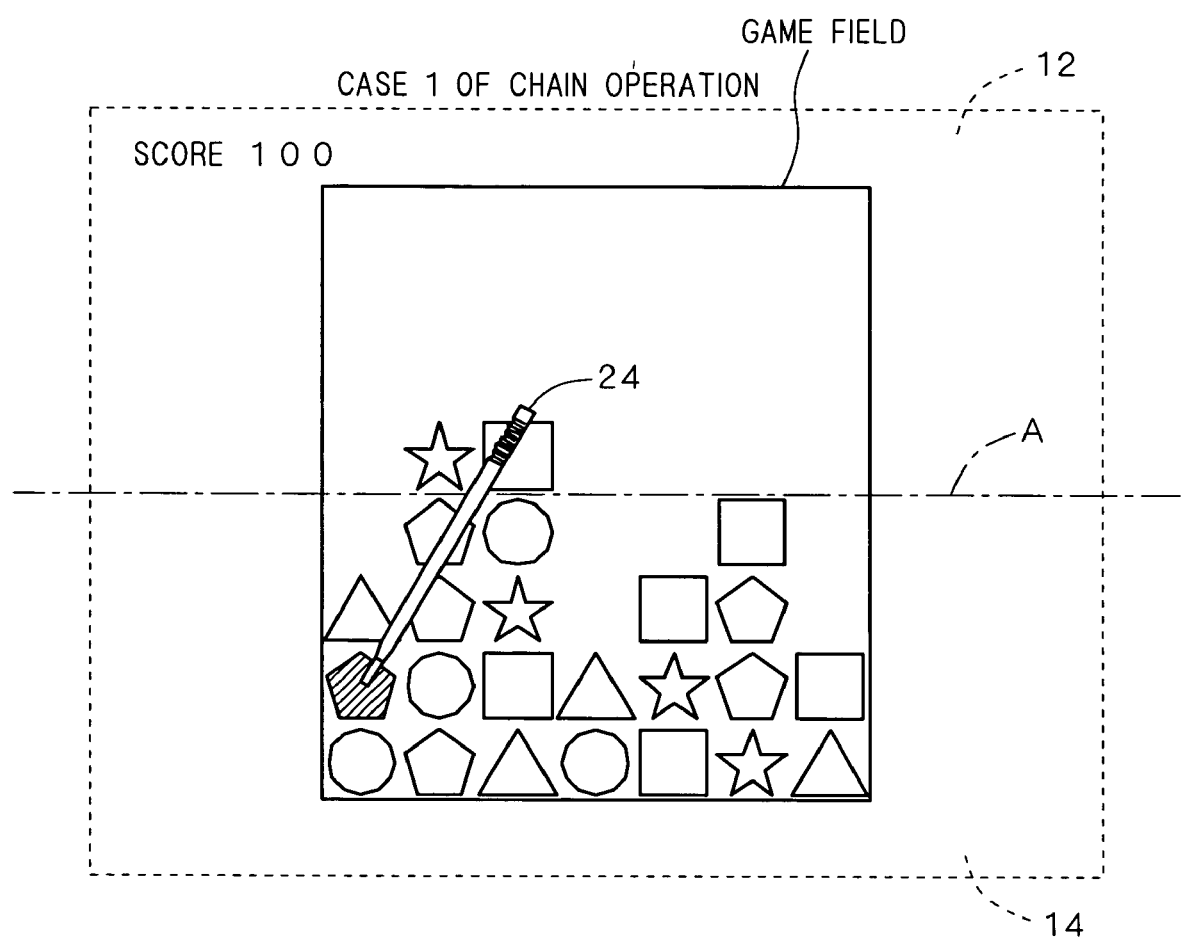
FIGS. 21 and 22 are views each illustrating a chain operation.

In the layout of puzzle elements shown in FIG. 21, for example, it is assumed that the stick 24 is brought into contact with the hatched pentagon pattern and moves this pattern rightward. Then, as shown in FIG. 22, in the second column from the left side, four pentagon patterns are continuously arranged in the vertical direction. At this time, the CPU core 42 judges that the presently-set delete condition (the first delete condition, and the first number (m=4) is set) is achieved and deletes these four pentagon patterns (Step S7j).

As can be seen from FIGS. 21 and 22, when the deletion is performed, the score increases by predetermined points (fifty points are added in this preferred embodiment). Further, as can be seen from FIG. 22, a new puzzle element (a puzzle element of pentagon in FIG. 22) is created in the upper portion of the first LCD 12 (Step S3 discussed earlier).

As can be seen from FIG. 22, when the puzzle elements are moved and deleted, a puzzle element which is stacked on the (deleted) puzzle elements before the movement or the deletion (a puzzle element of star shape stacked on the deleted puzzle elements in FIG. 22) becomes floating. Then, the CPU core 42 next causes the floating puzzle element to fall downward (Step S7k).

Herein, the fall is performed until the floating puzzle element gets on a puzzle element which is present in the same column. If no puzzle element is present in the same column (in the case of FIG. 22), the fall is performed until the floating puzzle element reaches the bottom portion.

Next, the CPU core 42 judges if the predetermined number (m) is "2" in the delete condition of puzzle elements which is stored in the RAM 48 (Step S7l).

If the value of m is not "2" ("NO" in Step S7l), the CPU core 42 reduces the value of m which is stored in the RAM 48 by "1" (Step S7m).

In other words, the delete condition which is stored in the RAM 48 is newly set (changed). The newly-set delete condition is defined as a condition in which puzzle elements of the same kind in the predetermined number after the reduction by "1" or more are continuously arranged in a predetermined direction.

This step is considered as a step where a next delete condition of the puzzle elements in which puzzle elements of the same kind in the second number which is smaller than the first number or more are continuously arranged in a predetermined direction is set as the second delete condition.

The amount of reduction for the first number is not necessarily limited to "1" but may be any value.

After the operation of Step S7m is finished, through returning, the process goes to Step S8 of FIG. 14.

On the other hand, if the value of m is equal to "2" ("YES" in Step S7l), the CPU core 42 does not reduce the value of m, and through returning, the process goes to Step S8 of FIG. 14.

As discussed above, the first number restricting the delete condition in the first delete condition is not smaller than three. Therefore, the operation of Step S7m is performed at least one time.

In the above-discussed case, the first number restricting the first delete condition and the amount of reduction in the predetermined number (m) in Step S7m may be arbitrarily set. In such a case, in Step S7l, the CPU core 42 makes the following judgment.

Specifically, the CPU core 42 judges the value of the predetermined number (m) restricting the present delete condition which is set (stored) in the RAM 48. On the basis of the judgment result, if the value of the predetermined number (m) after reduction in Step S7m becomes smaller than "2" ("YES" in Step S7l), the reduction of the predetermined number (m) is not performed.

On the other hand, if the value of the predetermined number (m) after reduction in Step S7m is not smaller than "2" ("NO" in Step S7l), the reduction of the predetermined number (m) is performed. In this case, the predetermined number (m) is reduced by an arbitrarily-set value in Step S7m.

After that, through returning, the process goes to Step S8 of FIG. 14.

Herein, Step S7a will be discussed again.

In Step S7a, if it is judged that the chain operation is being performed presently ("YES" in Step S7a), the CPU core 42 next judges if puzzle elements of the same kind in the predetermined number (m) or more are continuously arranged in the vertical or horizontal direction in accordance with the operation of the player (Step S7n). In other words, the CPU core 42 judges if the delete condition which is presently stored (set) in the RAM 48 is achieved (Step S7n).

If "YES" in Step S7a, naturally, the chain operation is being performed. Therefore, the delete condition stored (set) in the RAM 48 is changed from the initial delete condition (i.e., the first delete condition) to the second delete condition. In other words, as can be seen from the operation of Step S7m, the predetermined number (m) restricting the present second delete condition is smaller than the first number.

In this preferred embodiment, however, when the chain operation continues for a long time, the predetermined number (m) restricting the second delete condition eventually becomes "2". As can be seen from Step S7l, when the predetermined number is "2", the reduction of the predetermined number (m) is not performed. Therefore, after the predetermined number (m) becomes "2", the second delete condition used for the judgment in Step S7n does not change from the previous second delete condition.

As the result of judgment in Step S7n, if it is judged that the presently-set second delete condition is not achieved ("NO"

in Step S7n), the CPU core 42 compares the first valid time set in Step S7h with the time obtained by counting in Step S7i until that time (Step S7o).

If the counted time falls within the first valid time ("NO" in Step S7o), the second delete condition is kept as the delete condition of the puzzle elements, and through returning, the process goes to Step S8 of FIG. 14. In other words, until the counted time exceeds the first valid time, the deletion of the puzzle elements can be repeated under the second delete condition.

On the other hand, if the counted time exceeds the first valid time ("YES" in Step S7o), the CPU core 42 decides the end of the chain operation (Step S7p). In this case, the delete condition of the puzzle elements is changed to the first delete condition, as can be seen from Steps S7a to S7c of FIG. 20.

Figure 23:
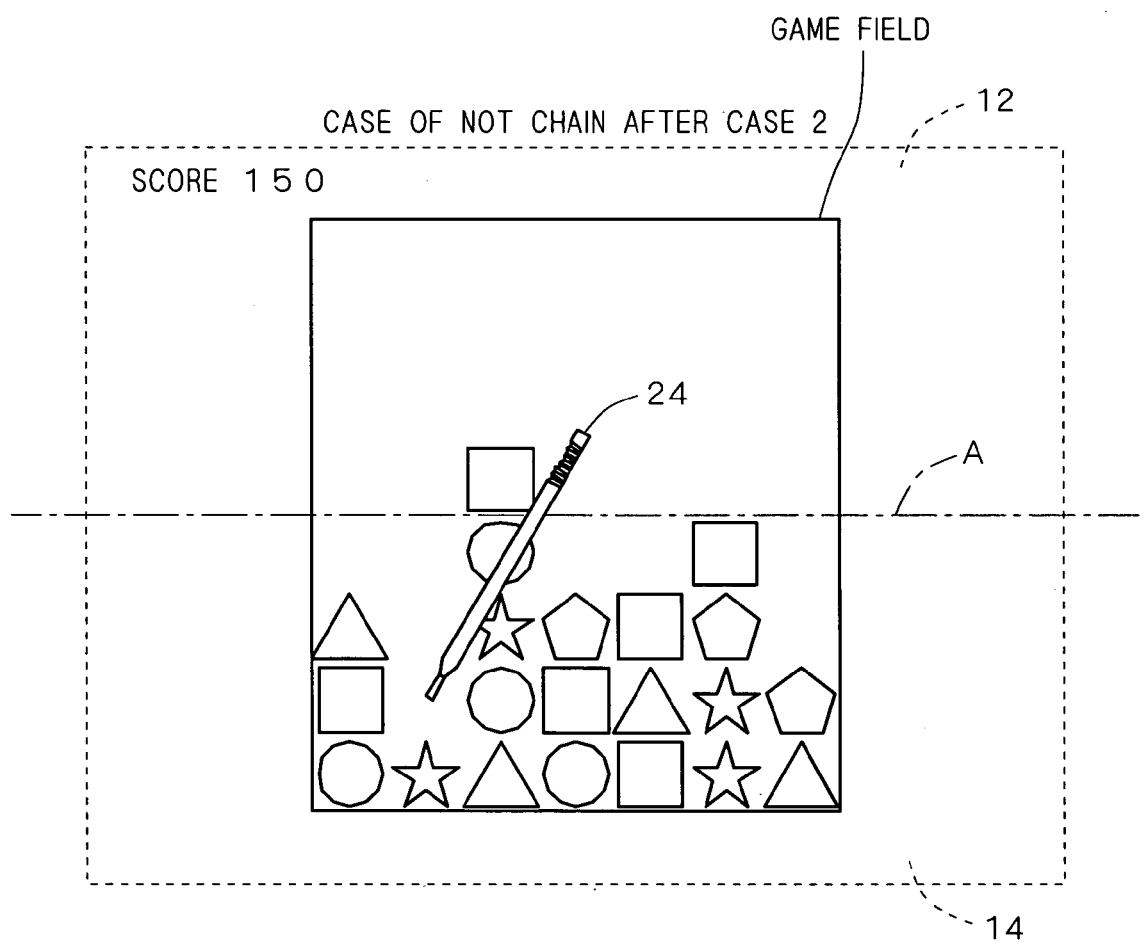
FIG. 23 is a view showing an exemplary case where a chain operation does not continue.

After that, as shown in FIG. 23, the CPU core 42 erases the display of "CHAIN CHANCE" indicating "during a chain operation" which is made on the second LCD 14 (Step S7q). Herein, FIG. 23 shows the case where the delete condition is not satisfied within the first valid time after the state of FIG. 22.

Further, the CPU core 42 detects the number of chain operations during the chain (i.e., the number of achievements of the delete condition) (Step S7r). Herein, the number of chain operations is equivalent to the number obtained by the increment in Step S7g. After that, through returning, the process goes to Step S8 of FIG. 14.

Herein, Step S7n will be discussed again.

As the result of judgment in Step S7n, if it is judged that the presently-set second delete condition is achieved ("YES" in Step S7n), the CPU core 42 causes the process to go to Step S7g.

In other words, the CPU core 42 further increments the number of chain operations which is stored in the RAM 48 by "1" (Step S7g).

Next, the CPU core 42 sets the second valid time in the RAM 48 (Step S7h).

The second valid time is a valid time while a new second delete condition is set as discussed later. The second valid time may be determined in accordance with the present number of chain operations and/or the predetermined number restricting the delete condition, as discussed above. In this preferred embodiment, the second valid time is shorter than the above-discussed first valid time.

Next, the CPU core 42 starts counting of the time (second time) passing from the time when the second valid time is set (Step S7i).

Since the CPU core 42 judges that the presently-set second delete condition is achieved in Step S7n, the puzzle elements satisfying the second delete condition are deleted (Step S7j).

Figure 24:
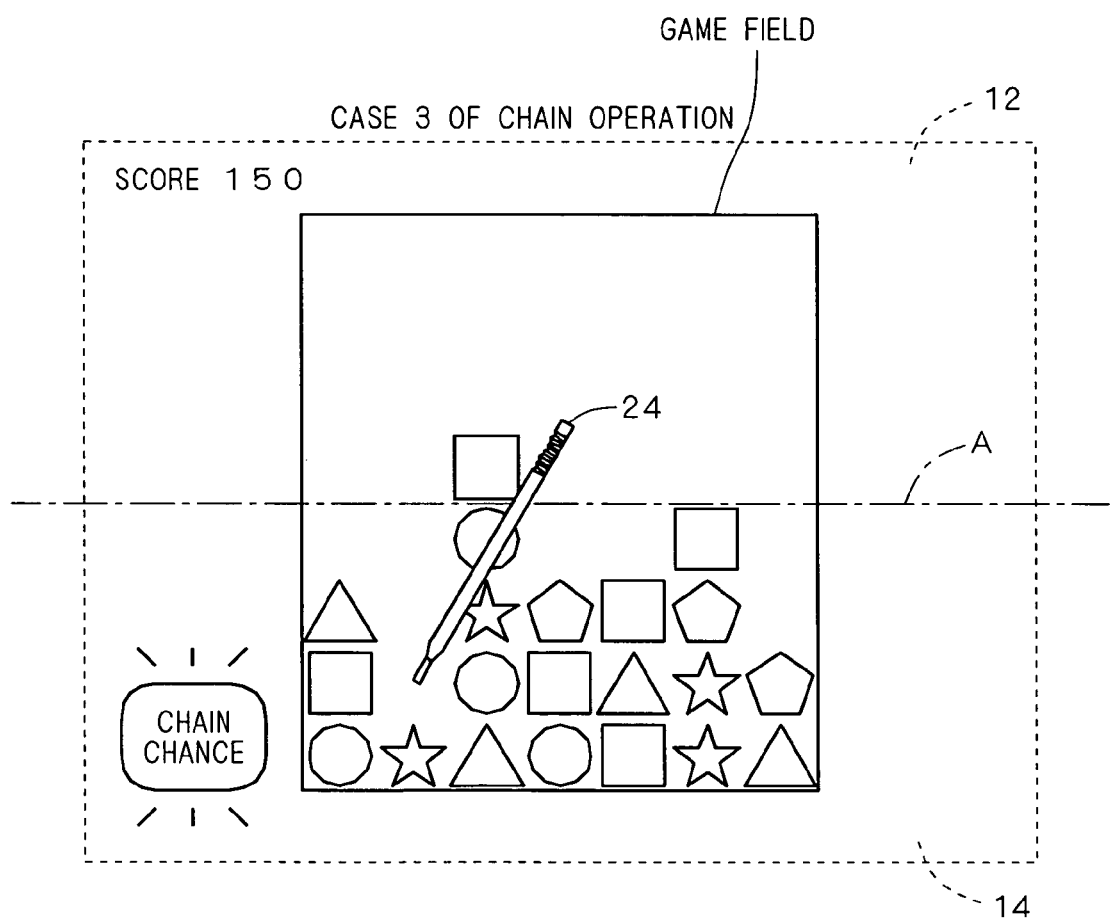
Figure 25:
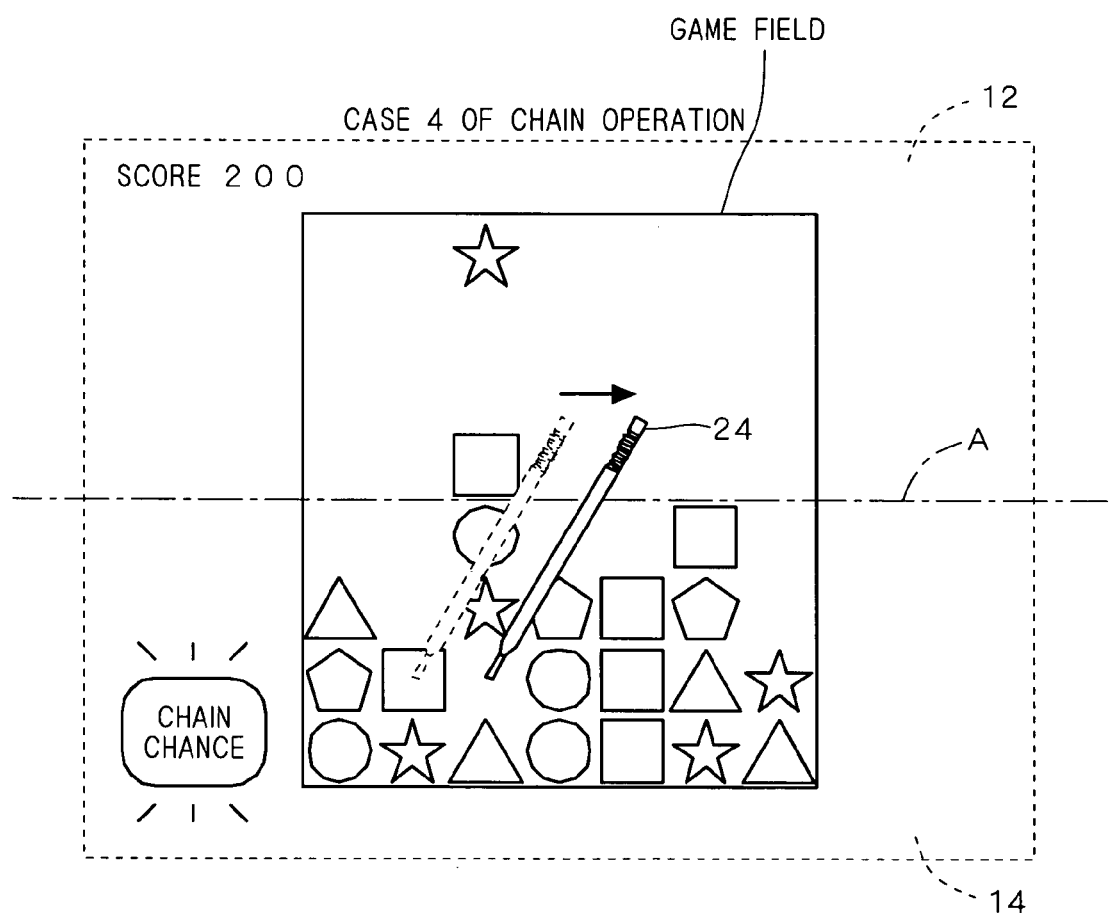

In the layout of puzzle elements shown in FIG. 24, for example, it is assumed that the stick 24 is brought into contact with the portion indicated in this figure and slidingly moved rightward. Then, as shown in FIG. 25, in the third column from the right side, three puzzle elements of square are continuously arranged in the vertical direction. At this time, FIG. 24 shows a state where the chain operation continues from the state of FIG. 22.

At this time, the CPU core 42 judges that the presently-set delete condition (The present delete condition is the second delete condition, and the second number (m=3) is set) is achieved and deletes these three puzzle elements of square (Step S7j).

As can be seen from FIGS. 24 and 25, when the deletion is performed, the score increases by predetermined points (fifty points are added in this preferred embodiment). Further, as can be seen from FIG. 25, a new puzzle element (a puzzle element of star shape in FIG. 25) is created in the upper portion of the first LCD 12 (Step S3 discussed earlier).

Then, the CPU core 42 next causes the floating puzzle element as a result of the movement and deletion of the puzzle elements to fall downward (Step S7k).

As can be seen from FIG. 25, no puzzle element is stacked on the deleted puzzle elements in the case of FIG. 25. But, with the movement, there exist floating puzzle elements (the puzzle elements over the second row from the bottom in the third column from the left side in FIG. 25). Therefore, the floating puzzle elements are caused to fall downward (Step S7k).

Next, the CPU core 42 judges if the present predetermined number (the value of m) is "2" in the delete condition of the puzzle elements which is stored in the RAM 48 (Step S7l).

If the value of m is not "2" ("NO" in Step S7l), the CPU core 42 reduces the value of m which is stored in the RAM 48 by "1" (Step S7m).

In other words, the delete condition which is stored in the RAM 48 is newly set (changed).

This step is considered as a step where a next delete condition of the puzzle elements in which puzzle elements of the same kind in the third number which is smaller than the second number or more are continuously arranged in a predetermined direction is set as a new second delete condition.

The amount of reduction for the second number is not necessarily limited to "1" but may be any value, as discussed above.

After the operation of Step S7m is finished, through returning, the process goes to Step S8 of FIG. 14.

On the other hand, if the value of m is equal to "2" ("YES" in Step S7l), the CPU core 42 does not reduce the value of the second number (the present predetermined number (m)), and through returning, the process goes to Step S8 of FIG. 14.

After that, as the result of judgment in Step S7n, if it is judged that the presently-set new second delete condition is not achieved ("NO" in Step S7n), the CPU core 42 compares the second valid time set in Step S7h with the time obtained by counting in Step S7i until that time (Step S7o).

If the counted time falls within the second valid time ("NO" in Step S7o), the new second delete condition is kept as the delete condition of the puzzle elements, and through returning, the process goes to Step S8 of FIG. 14. In other words, until the counted time exceeds the second valid time, the deletion of the puzzle elements is repeated under the new second delete condition.

On the other hand, if the counted time exceeds the second valid time ("YES" in Step S7o), the CPU core 42 decides the end of the chain operation (Step S7p). In this case, the delete condition of the puzzle elements is changed to the first delete condition, as can be seen from Steps S7a to S7c of FIG. 20.

Through the above operation flow, the chain operation continuously occurs and when the condition is not satisfied, the chain operation is ended.

Figure 27:
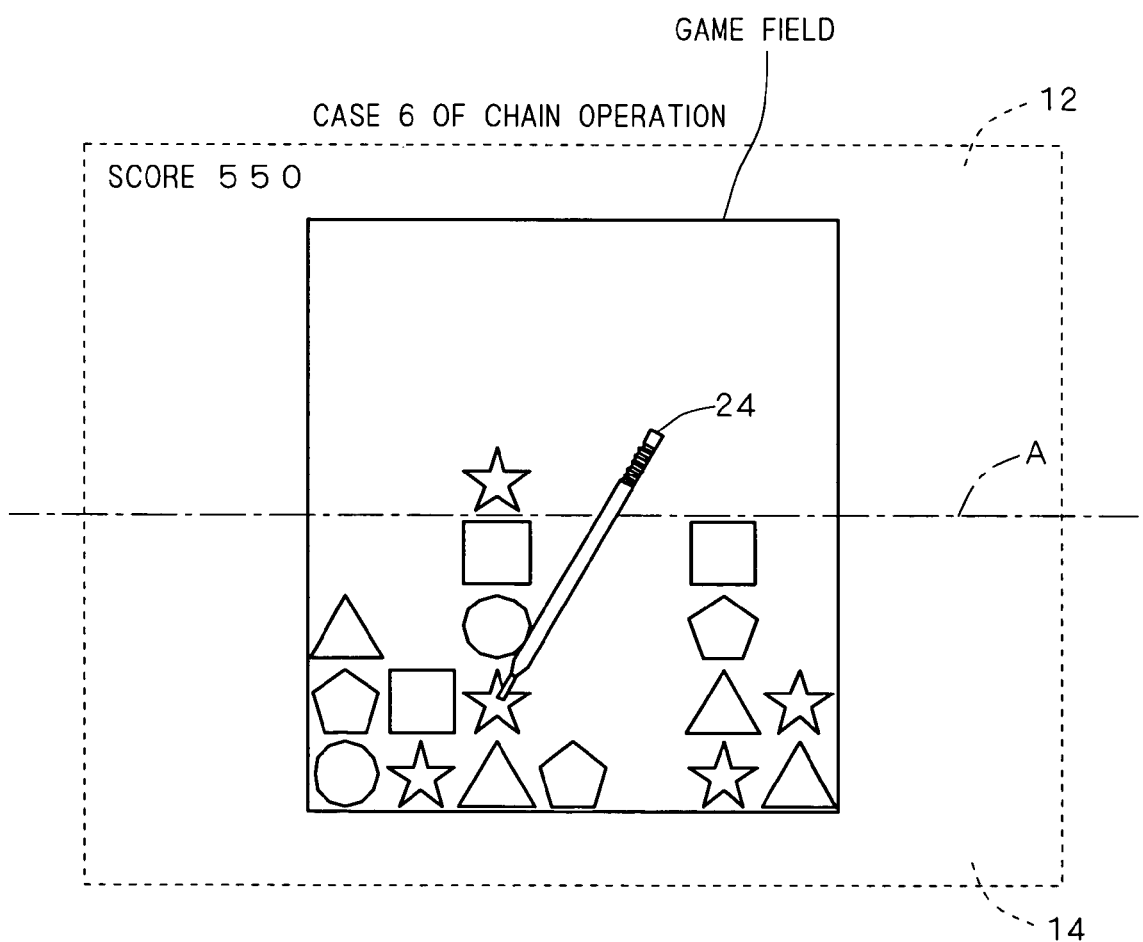
FIG. 27 is a view showing a state where a bonus score is added in accordance with the number of chain operations.

Herein, FIGS. 26 and 27 each show a state of chain operation after the state of FIG. 25. As can be seen from these figures, since the predetermined number restricting the second delete condition is reduced from the second number (m=3) to the third number (m=2) (Step S7m), two puzzle elements of circle are deleted.

As the result of the movement of FIG. 25, the floating puzzle elements are caused to fall downward (Step S7k). Further, a puzzle element of star shape which is newly created is caused to fall downward.

<B-6> Other Operations

Figure 28:
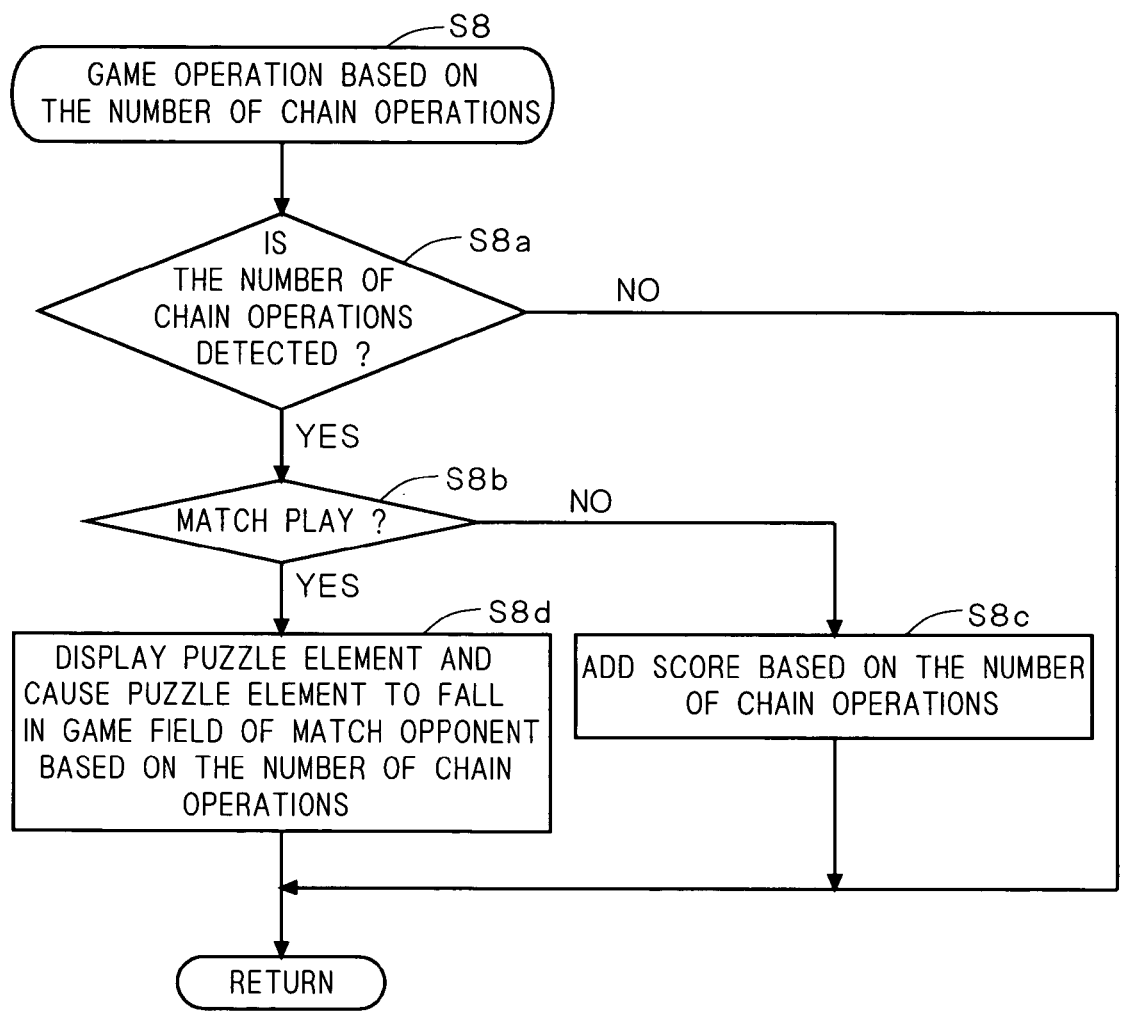
FIG. 28 is a sub-flowchart showing an operation flow for reflecting a predetermined effect on the proceeding of a game in accordance with the number of chain operations.

Next, an operation of the game in which the proceeding of the puzzle game is changed in accordance with the number of chain operations (the number of achievements of the delete condition in the chain operations) shown in FIG. 14 will be discussed in detail, referring to the sub-flowchart of FIG. 28.

The operation of the game in which the proceeding of the puzzle game is changed in accordance with the number of chain operations refers to an operation to give a bonus score or give a predetermined puzzle element in the game field of the match opponent.

First, the CPU core 42 judges if the number of chain operations which is detected in Step S7*r* exists (Step S8*a*).

If the number of chain operations is not detected ("NO" in Step S8*a*), this means that the chain operation does not start or the chain operation continues. Therefore, through returning, the process goes to Step S9 of FIG. 14. As a result, before the start of the chain operation or during the continuance of the chain operation, the proceeding of the puzzle game is not changed in accordance with the number of chain operations.

On the other hand, if the number of chain operations is detected ("YES" in Step S8*a*), the CPU core 42 next judges if the present play mode is a match play mode (Step S8*b*).

If the CPU core 42 judges that the present play mode is not a match play mode (i.e., a single play mode) ("NO" in Step S8*b*), the CPU core 42 changes the proceeding of the puzzle game in accordance with the number of chain operations which is counted in Step S7*g* and detected in Step S8*a* (Step S8*c*). Herein, in this case, since the present mode is not a match play mode, the CPU core 42 gives (adds) a bonus score (Step S8*c*).

In FIGS. 26 and 27, for example, when the chain operation is ended after the state of FIG. 26, the display of "CHAIN CHANCE" is erased from the second LCD 14 and the bonus score of 300 points in accordance with the number of chain operations is added in the first LCD 12 as shown in FIG. 27.

Herein, it is possible to set the bonus score to be added higher as the number of chain operations becomes larger (in other words, bonus score=the number of chain operations× A:A is any value).

After the operation of Step S8*c* is finished, through returning, the process goes to Step S9 of FIG. 14.

On the other hand, if the CPU core 42 judges that the present play mode is a match play mode ("YES" in Step S8*b*), the CPU core 42 changes the proceeding of the puzzle game in accordance with the number of chain operations which is counted in Step S7*g* and detected in Step S8*a* (Step S8*d*).

Figure 29:
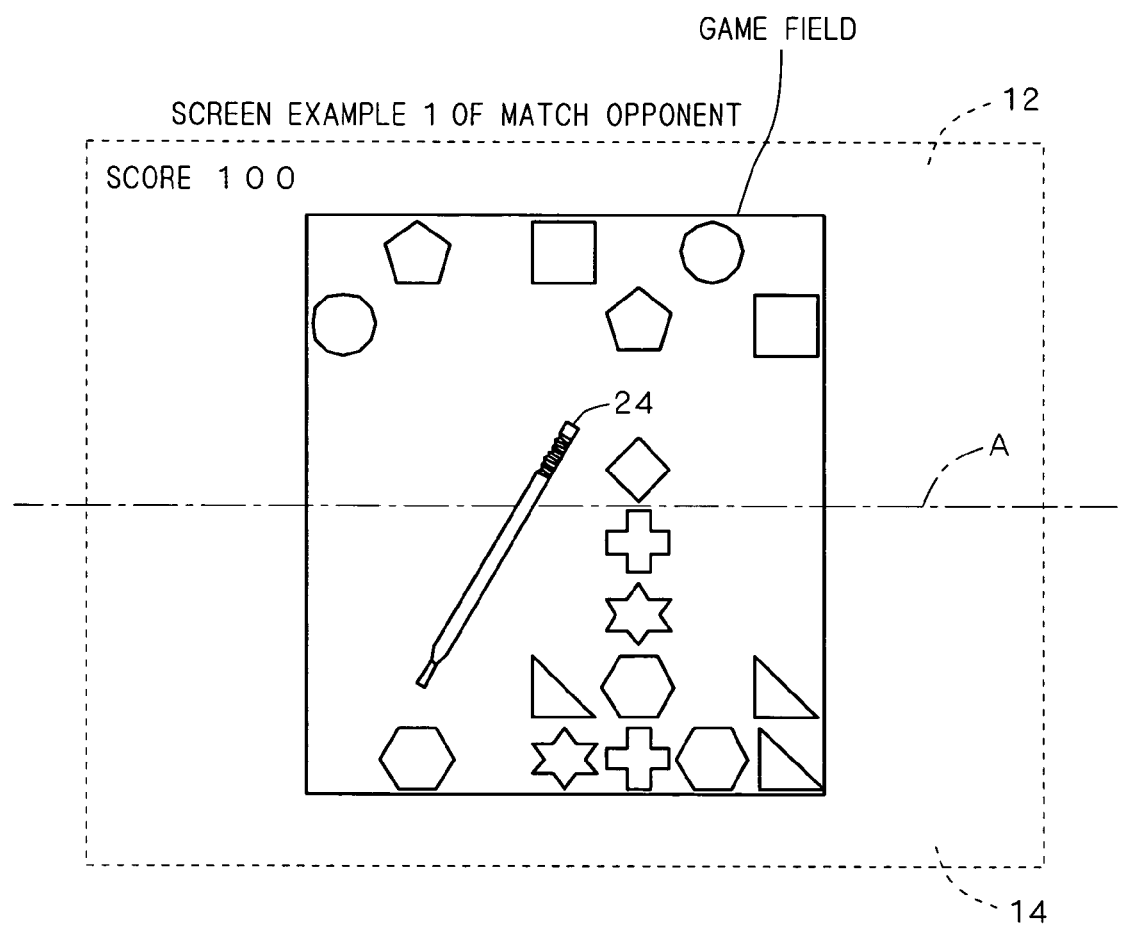
FIG. 29 is a view showing a state where puzzle elements are created in a game field of a match opponent in accordance with the number of chain operations.
Figure 30:
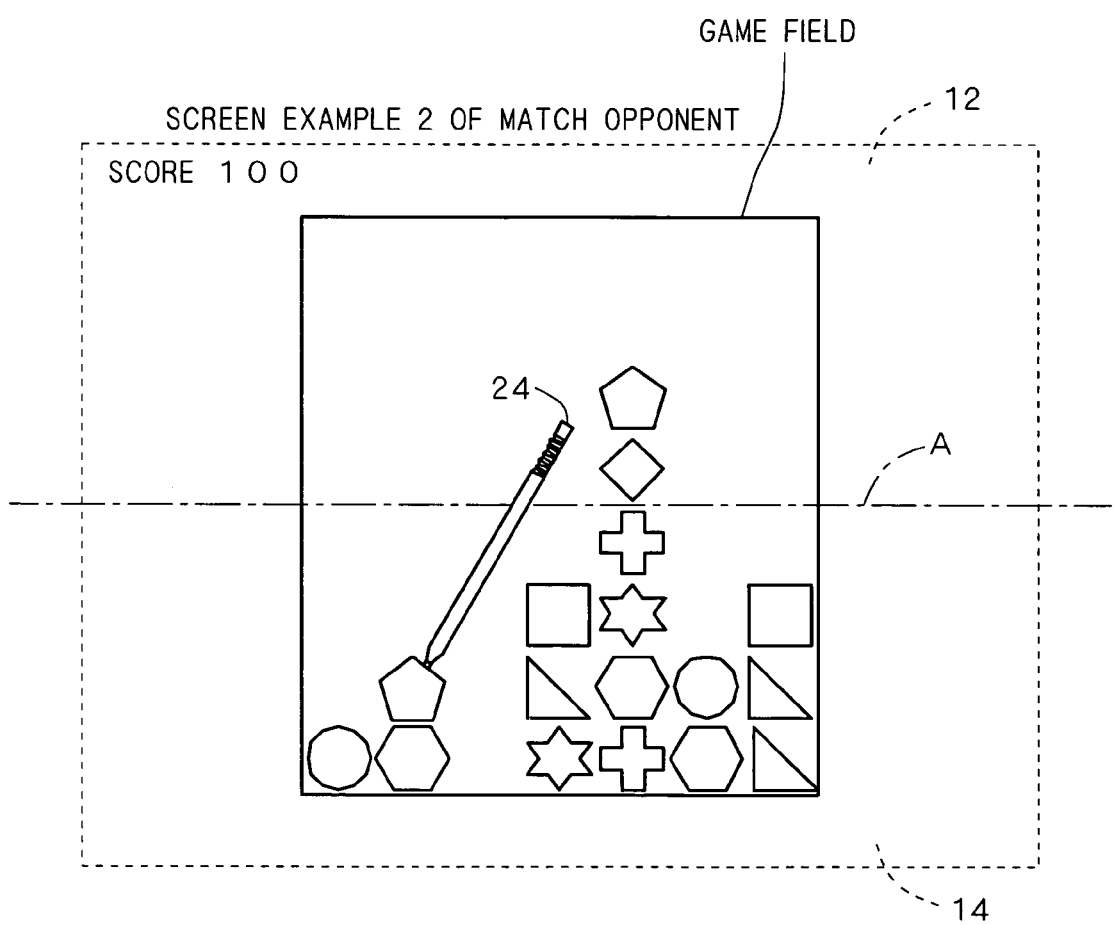
FIG. 30 is a view showing a state after the fall of the puzzle elements which are created in the game field of the match opponent.

Herein, in this case, since the present mode is a match play mode, the CPU core 42 displays (creates) predetermined puzzle elements at given positions in the game field (the LCDs 12 and 14) of the match opponent (see FIG. 29) and causes the predetermined puzzle elements to fall (see FIG. 30) (Step S8*d*).

Herein, it is possible to set a larger number of puzzle elements to be given to the match opponent as the number of chain operations becomes larger (in other words, the number of puzzle elements to be given=the number of chain operations×B:B is any value).

The puzzle elements to be given to the match opponent may be ones of the same kind as those which are deleted in the chain operation. In this preferred embodiment, the match opponents have different kinds of puzzle elements which are displayed in the initial screens and selected and displayed in Steps S2 and S3. Therefore, as discussed above, if the puzzle elements to be given are of the kind of the puzzle elements which the match opponent has, the number of kinds of puzzle elements on the receiving side increases. For this reason, it becomes harder for the player on the receiving side to satisfy the delete condition.

Among the puzzle elements to be given, the puzzle elements which are impossible to delete may be included.

After the operation of Step S8*d* is finished, through returning, the process goes to Step S9 of FIG. 14.

In Step S9, the CPU core 42 judges if all the columns of puzzle elements reach the highest stage of the game field. In other words, the CPU core 42 judges if the puzzle elements are displayed with no space in the entire game field of the LCDs 12 and 14.

If the CPU core 42 judges that all the columns of puzzle elements do not reach the highest stage of the game field ("NO" in Step S9), the CPU core 42 causes the process to return to Step S2 and repeats the operation of Step S2 and the following steps.

On the other hand, if the CPU core 42 judges that all the columns of puzzle elements reach the highest stage of the game field ("YES" in Step S9), the CPU core 42 ends the puzzle game (makes the game over) (Step S1O). In the case of match play mode, a player who first satisfies the condition of Step S9 ("YES" in Step S9) loses. As another preferred embodiment, in Step S9, the puzzle game may be ended when it is judged that any one of the columns of puzzle elements reaches the highest stage of the game field.

As can be seen from the above operation, in the game program and the game device 10 of this preferred embodiment, the first delete condition to delete the puzzle elements is restricted by the first number. When the first delete condition is achieved, the second delete condition is reset as the delete condition. The second delete condition is restricted by the second number which is smaller than the first number.

Therefore, in accordance with the proceeding of the puzzle game, it is possible to change the delete condition of the puzzle elements to an easier condition (from the first delete condition to the second delete condition). Accordingly, it is possible to easily perform the chain operation in which the deletion of the puzzle elements is repeated.

In the game program of this preferred embodiment, the first valid time is set when it is judged that the first delete condition is achieved. Further, the first time passing from the time when it is judged that the first delete condition is achieved is counted. If the first time obtained by counting falls within the first valid time, the second delete condition is set as the delete condition of the puzzle elements and if the counted first time exceeds the first valid time, the first delete condition is set as the delete condition of the puzzle elements. Therefore, since the valid time is set on the change of the delete condition to an easier one, it is possible to give the tension to the game.

In the game program of this preferred embodiment, a new second delete condition is set as the next delete condition of the puzzle elements when it is judged that the second delete condition is achieved. Further, when it is judged that the second delete condition is achieved, the second valid time is set and the second time passing from the time when it is judged that the second delete condition is achieved is counted. If the second time obtained by counting falls within the second valid time, the new second delete condition is set and if the counted second time exceeds the second valid time, the first delete condition is set. Therefore, it is possible to make the delete condition easier as the number of repeats of the deletion of the puzzle elements becomes larger, and even if only few puzzle elements are left after the repeat of deletion, it is possible to perform a chain operation in which the deletion of the puzzle elements is repeated, in a relatively easy manner.

In the game program of this preferred embodiment, the second valid time is shorter than the first valid time. For this reason, in order to keep the continuance of the chain operation, it becomes necessary to achieve the next delete condition earlier as the chain operation goes on. Therefore, it is possible to further increase the tension of the game.

In the game program of this preferred embodiment, when the chain operation is ended, the number of achievements of the delete condition in the chain operations (the number of chain operations) is counted up. Further, in accordance with the counted number, the proceeding of the puzzle game is changed. Therefore, since the proceeding of the puzzle game is changed in accordance with the number of chain operations in which the deletion of the puzzle elements is repeated, it is possible to achieve a changeful and interesting puzzle game.

In the game program of this preferred embodiment, the position and the direction on the second LCD 14 which are indicated are detected by the player's manipulation of the touch panel in association with the second LCD 14. Then, a set of puzzle elements are specified in accordance with the detected position and the specified set of puzzle elements are moved in accordance with the detected direction. Therefore, since the puzzle elements can be manipulated by using the touch panel, it is possible to achieve an intuitive puzzle game with excellent operability.

While the invention has been shown and described in detail, the foregoing description is in all aspects illustrative and not restrictive. It is therefore understood that numerous modifications and variations can be devised without departing from the scope of the invention.

What is claimed is:

1. A computer software product including a recording medium in which a computer-readable program is recorded, said game program being used for causing a computer to perform a puzzle game in which a plurality of kinds of puzzle elements are sequentially created and displayed on display means while the layout position of said puzzle elements is changed in accordance with an operation of a player and when puzzle elements of a same kind are arranged continuously in a predetermined direction, said puzzle elements of the same kind which are continuously arranged are deleted, said game program causing a computer to execute:

a first delete condition setting step of setting a first number and setting a delete condition of said puzzle elements in which at least said first number of puzzle elements of the same kind are continuously arranged in a predetermined direction as a first delete condition;

a first delete condition judgment step of judging if said first delete condition is achieved in accordance with the operation of said player;

a puzzle element deleting step of deleting puzzle elements satisfying said first delete condition when it is judged that said first delete condition is achieved in said first delete condition judgment step;

a second delete condition setting step of setting a second number based on said first number such that said second number is less than said first number and setting a next delete condition of said puzzle elements in which at least said second number of puzzle elements of the same kind are continuously arranged in a predetermined direction as a second delete condition when it is judged that said first delete condition is achieved in said first delete condition judgment step; and a second delete condition judgment step of judging if said second delete condition is achieved after said second delete condition is set, wherein said puzzle element deleting step deletes puzzle elements satisfying said second delete condition when it is judged that said second delete condition is achieved in said second delete condition judgment step.

2. The computer software product according to claim 1, causing said computer to further execute:

a valid time setting step of setting a first valid time while said second delete condition is set when it is judged that said first delete condition is achieved in said first delete condition judgment step;

a time counting step of counting a first time passing from the time when it is judged that said first delete condition is achieved in said first delete condition judgment step; and a delete condition changing step of setting said second delete condition as the delete condition of said puzzle elements when said first time obtained by counting in said time counting step falls within said first valid time and setting said first delete condition as the delete condition of said puzzle elements when said first time obtained by counting in said time counting step exceeds said first valid time.

3. The computer software product according to claim 2, wherein said second delete condition setting means sets a next delete condition of said puzzle elements in which at least a third number of puzzle elements of the same kind are continuously arranged in a predetermined direction as a new second delete condition when said second delete condition judgment means judge that said second delete condition is achieved, said third number being smaller than said second number, said valid time setting step sets a second valid time while said new second delete condition is set when it is judged that said second delete condition is achieved in said second delete condition judgment step, said time counting step counts a second time passing from the time when it is judged that said second delete condition is achieved in said second delete condition judgment step, and said delete condition changing step sets said new second delete condition as the delete condition of said puzzle elements when said second time obtained by counting in said time counting step falls within said second valid time and sets said first delete condition as the delete condition of said puzzle elements when said second time obtained by counting in said time counting step exceeds said second valid time.

4. The computer software product according to claim 3, wherein said second valid time is shorter than said first valid time.

5. The computer software product according to claim 3, causing said computer to further execute:

an achievement number counting step of counting a number of achievements of said delete condition; and a game processing step of changing a proceeding of said puzzle game in accordance with said number of achievements counted in said achievement number counting step.

6. The computer software product according to claim 1, wherein a touch panel is provided in association with said display means, said game program causing said computer to further execute:

a manipulation indication detecting step of detecting a position and a direction on said display means which are indicated with manipulation of said touch panel by said player; and a puzzle element movement controlling step of specifying a set of said puzzle elements in accordance with said position detected in said manipulation indication detecting step and moving said set of puzzle elements specified in accordance with said direction detected in said manipulation indication detecting step.

7. A gaming device, comprising
display means,
said game device performing a puzzle game on a computer, in which a plurality of kinds of puzzle elements are sequentially created and displayed on said display means while the layout position of said puzzle elements is changed in accordance with an operation of a player and when puzzle elements of a same kind are arranged continuously in a predetermined direction, said puzzle elements of the same kind which are continuously arranged are deleted,
said gaming device further comprising:
first delete condition setting means for setting a first number and setting a delete condition of said puzzle elements in which at least a first number of puzzle elements of the same kind are continuously arranged in a predetermined direction as a first delete condition;
first delete condition judgment means for judging if said first delete condition is achieved in accordance with the operation of said player;
puzzle element deleting means for deleting puzzle elements satisfying said first delete condition when it is judged that said first delete condition is achieved by said first delete condition judgment means;
second delete condition setting means for setting a second number based on said first number such that said second number is less than said first number and setting a next delete condition of said puzzle elements in which at least said second number of puzzle elements of the same kind are continuously arranged in a predetermined direction as a second delete condition when it is judged that said first delete condition is achieved by said first delete condition judgment means; and
second delete condition judgment means for judging if said second delete condition is achieved after said second delete condition is set,
wherein said puzzle element deleting means deletes puzzle elements satisfying said second delete condition when it is judged that said second delete condition is achieved by said second delete condition judgment means.

8. The game device according to claim 7, further comprising:
valid time setting means for setting a first valid time while said second delete condition is set when it is judged that said first delete condition is achieved by said first delete condition judgment means;
time counting means for counting a first time passing from the time when it is judged that said first delete condition is achieved by said first delete condition judgment means; and
delete condition changing means for setting said second delete condition as the delete condition of said puzzle elements when said first time obtained by said time counting means falls within said first valid time and setting said first delete condition as the delete condition of said puzzle elements when said first time obtained by said time counting means exceeds said first valid time.

9. The game device according to claim 8, wherein
said second delete condition setting means sets a next delete condition of said puzzle elements in which at least a third number of puzzle elements of the same kind are continuously arranged in a predetermined direction as a new second delete condition when it is judged that said second delete condition is achieved by said second delete condition judgment means, said third number being smaller than said second number,
said valid time setting means sets a second valid time while said new second delete condition is set when it is judged that said second delete condition is achieved by said second delete condition judgment means,
said time counting means counts a second time passing from the time when it is judged that said second delete condition is achieved by said second delete condition judgment means, and
said delete condition changing means sets said new second delete condition as the delete condition of said puzzle elements when said second time obtained by said time counting means falls within said second valid time and sets said first delete condition as the delete condition of said puzzle elements when said second time obtained by said time counting means exceeds said second valid time.

10. The game device according to claim 9, wherein said second valid time is shorter than said first valid time.

11. The game device according to claim 9, further comprising:
achievement number counting means for counting a number of achievements of said delete condition; and
game processing means for changing a proceeding of said puzzle game in accordance with said number of achievements counted by said achievement number counting means.

12. The game device according to claim 7, wherein a touch panel is provided in association with said display means, said device further comprising:
manipulation indication detecting means for detecting a position and a direction on said display means which are indicated with manipulation of said touch panel by said player; and
puzzle element movement controlling means for specifying a set of said puzzle elements in accordance with said position detected by said manipulation indication detecting means and moving said set of puzzle elements specified in accordance with said direction detected by said manipulation indication detecting means.

* * * * *